(12) United States Patent
Medeot et al.

(10) Patent No.: US 11,887,566 B2
(45) Date of Patent: Jan. 30, 2024

(54) METHOD OF GENERATING MUSIC DATA

(71) Applicant: BYTEDANCE INC., Wilmington, DE (US)

(72) Inventors: Gabriele Medeot, London (GB); Srikanth Cherla, London (GB); Katerina Kosta, London (GB); Matt Mcvicar, London (GB); Samer Abdallah, London (GB); Marco Selvi, London (GB); Ed Newton-Rex, London (GB); Kevin Webster, London (GB)

(73) Assignee: BYTEDANCE INC., Wilmington, DE (US)

( * ) Notice: Subject to any disclaimer, the term of this patent is extended or adjusted under 35 U.S.C. 154(b) by 716 days.

(21) Appl. No.: 16/967,064

(22) PCT Filed: Feb. 14, 2019

(86) PCT No.: PCT/GB2019/050397
§ 371 (c)(1),
(2) Date: Aug. 3, 2020

(87) PCT Pub. No.: WO2019/158927
PCT Pub. Date: Aug. 22, 2019

(65) Prior Publication Data
US 2021/0049990 A1   Feb. 18, 2021

(30) Foreign Application Priority Data

Feb. 14, 2018 (GB) ..................................... 1802440
Mar. 29, 2018 (GB) ..................................... 1805201

(51) Int. Cl.
*G10H 1/00* (2006.01)
*G10H 1/26* (2006.01)
(Continued)

(52) U.S. Cl.
CPC ............ *G10H 1/0025* (2013.01); *G06N 7/01* (2023.01); *G06N 20/00* (2019.01); *G10H 1/0066* (2013.01); *G10H 1/26* (2013.01)

(58) Field of Classification Search
CPC ...... G10H 1/0025; G10H 1/0066; G10H 1/26; G06N 20/00; G06N 7/01
(Continued)

(56) References Cited

U.S. PATENT DOCUMENTS 6,225,546 B1 *  5/2001  Kraft ........................ G10H 1/00
                                                              84/645
6,297,439 B1 * 10/2001  Browne .................... G10H 1/26
                                                              84/DIG. 12
(Continued)

FOREIGN PATENT DOCUMENTS

CN    102543052 A       7/2012
CN    103823867 A  *    5/2014  ....... G06F 17/30743
(Continued)

OTHER PUBLICATIONS

International Patent Application No. PCT/GB2019/050397; Int'l Search Report and the Written Opinion; dated Jul. 22, 2019; 22 pages.
(Continued)

*Primary Examiner* — Christina M Schreiber
(74) *Attorney, Agent, or Firm* — BakerHostetler

(57) ABSTRACT

A computer-implemented method of generating a piece of music is disclosed. The method comprises: determining an initial sequence of notes for the piece of music; determining at least one probability distribution for selecting at least one subsequent note from a set of candidate notes; generating a biasing output based on data of the initial sequence of notes; and extending the initial sequence of notes with at least one subsequent note selected from the set of candidate notes
(Continued)

according to the probability distribution and the biasing output, wherein the biasing output biases the selection so as to affect the likelihood of the selection resulting in a repeat of a musical element formed by the initial sequence of notes.

17 Claims, 7 Drawing Sheets

(51) Int. Cl.
*G06N 20/00* (2019.01)
*G06N 7/01* (2023.01)

(58) Field of Classification Search
USPC .......................................................... 84/609
See application file for complete search history.

(56) References Cited

U.S. PATENT DOCUMENTS

| | | | |
|---|---|---|---|
| 6,506,969 B1 | 1/2003 | Baron | |
| 8,916,762 B2* | 12/2014 | Saino | G10H 1/0058 84/622 |
| 9,110,817 B2* | 8/2015 | Pachet | G06F 17/10 |
| 9,361,869 B2* | 6/2016 | Rex | G10H 1/40 |
| 9,600,764 B1* | 3/2017 | Rastrow | G06N 3/049 |
| 10,068,557 B1* | 9/2018 | Engel | G06N 3/045 |
| 11,657,787 B2* | 5/2023 | Silverstein | G10H 1/0025 84/600 |
| 2002/0194984 A1* | 12/2002 | Pachet | G10H 1/0025 84/609 |
| 2003/0065517 A1 | 4/2003 | Myashita et al. | |
| 2008/0114564 A1* | 5/2008 | Ihara | G06F 16/35 702/158 |
| 2009/0005890 A1 | 1/2009 | Zhang | |
| 2010/0223223 A1* | 9/2010 | Sandler | G06F 16/683 706/50 |
| 2011/0010321 A1* | 1/2011 | Pachet | G06N 20/00 706/12 |
| 2012/0312145 A1* | 12/2012 | Kellett | G10H 1/38 84/613 |
| 2014/0366710 A1 | 12/2014 | Eronen et al. | |
| 2018/0322854 A1* | 11/2018 | Ackerman | G06N 7/01 |
| 2020/0380940 A1* | 12/2020 | Abdallah | G10H 1/0066 |
| 2021/0049990 A1* | 2/2021 | Medeot | G10H 1/26 |

FOREIGN PATENT DOCUMENTS

| | | | | |
|---|---|---|---|---|
| CN | 107103917 A | | 8/2017 | |
| CN | 112435642 A | * | 3/2021 | ........... G06F 16/951 |
| CN | 113516961 A | * | 10/2021 | |
| JP | H10-011056 A | | 1/1998 | |
| JP | 2004-233965 A | | 8/2004 | |
| JP | 2007-004152 A | | 1/2007 | |
| JP | 2008-065153 A | | 3/2008 | |
| JP | 2018537727 A | * | 12/2018 | |
| KR | 2006-0029663 A | | 4/2006 | |

OTHER PUBLICATIONS

"StructureNet: Inducing Structure in Generated Melodies"; 19th Int'l Society for Music Information Retrieval Conf.; 2018; 7 pages.

* cited by examiner

|  | | Duration of next note | | | | | | | |
|---|---|---|---|---|---|---|---|---|---|
|  | | 0.5 | 1 | 1.5 | 2 | 2.5 | 3 | 3.5 | 4 |
| Duration of previous note | 0.5 | p | p | p | p | p | p | p | p |
| | 1 | p | p | p | p | p | p | p | p |
| | 1.5 | p | p | p | p | p | p | p | p |
| | 2 | p | p | p | p | p | p | p | p |
| | 2.5 | p | p | p | p | p | p | p | p |
| | 3 | p | p | p | p | p | p | p | p |
| | 3.5 | p | p | p | p | p | p | p | p |
| | 4 | p | p | p | p | p | p | p | p |

Figure 7

METHOD OF GENERATING MUSIC DATA

FIELD

The disclosure relates to a computer-implemented method of generating a piece of music.

BACKGROUND

Previous attempts at generative music software have generally fallen into two categories: those whose musical output does not include the level of structure that is required for the music to be pleasing to the listener, because they do not apply the rules and constraints to the output that are necessary to produce such structure; and those that incorporate structure using hard-coded rules and constraints to the output, which result in the output being predictable and lacking the musical quality and variation that is found in human-composed music.

Methods for generating more complex and aurally pleasing music, in which longer range repeats and patterns feature but in which the musical quality and variation of a system that avoids hard-coded rules and constraints on output is retained, are needed.

SUMMARY

The embodiments disclosed herein provide a manner of introducing a long-term structure in machine-generated music. Structure is a key aspect of music composed by humans that plays a crucial role in giving a piece of music a sense of overall coherence and intentionality. Structure appears in a piece of music as a collection of musical patterns, variations of these patterns, literal or motive repeats and transformations of sections of music that have occurred earlier in the same piece.

An invention is set out in the claims.

In a first aspect, a computer-implemented method of providing one or more outputs at one or more respective time instants is provided. The method comprises generating at least one first data object executable to provide a first portion of an output, the at least one first data object comprising a parameter having a first value associated therewith; placing the at least one first data object in a first position in a sequence; generating at least one second data object executable to provide a second portion of the output; generating a first array of probabilities for a second value of the parameter for the at least one second data object, the first array of probabilities being influenced by the first value; generating a second array of probabilities for the second value of the parameter, the second array of probabilities comprising a probability that the second value is equal to the first value; combining the first array and the second array to provide a modified array of probabilities; determining and setting the second value based on the modified array of probabilities; placing the at least one second data object in a second position in the sequence, the second position providing a second portion of the output; and outputting the at least one first and second data objects at the respective first and second positions in the sequence to provide the output, wherein the at least one first and second data objects represent audio data or MIDI data.

Optionally, outputting the first and second data objects comprises: playing the audio data or MIDI data, or storing the audio data for playing, or storing the MIDI data.

Optionally, the first data object corresponds to a first musical note, and the second data object corresponds to a second musical note.

Optionally, the parameter is a note duration and the first and second values are note duration lengths.

Optionally, the parameter is one of: a note pitch, a note dynamic, or a note articulation.

Optionally, the first data object further comprises a first pitch value, wherein the first pitch value is a first note pitch.

Optionally, the first array of probabilities is influenced by both the first value and the first pitch value.

Optionally, the second data object further comprises a second pitch value, wherein the second pitch value is a second note pitch.

Optionally, the first array of probabilities is generated by a first neural network.

Optionally, the first array of probabilities is generated based on a rule.

Optionally, the first data object corresponds to a first note in a piece of music.

Optionally, the second data object corresponds to a second note in a piece of music.

Optionally, the second position in the sequence directly follows the first position in the sequence.

Optionally, the second position in the sequence does not directly follow the first position in the sequence.

Optionally, the second array of probabilities is generated by a second neural network.

Optionally, the second array of probabilities is based on a rule.

Optionally, the second neural network is a recurrent neural network.

Optionally, the second array of probabilities comprises a plurality of vectors, each vector comprising at least one tag having a probability associated therewith.

Optionally, a first tag defines whether the second value is equal to the first value.

Optionally, a second tag identifies the first data object.

Optionally, a third tag identifies the first value.

Optionally, a fourth tag identifies the first position in the sequence.

Optionally, a fifth tag identifies an interval between the first data object and a preceding data object.

In another aspect, a computer-implemented method of generating an input to train a neural network is provided. The method comprises: receiving music data, the music data corresponding to a plurality of data objects; identifying at least one parameter of the music data, wherein a first data object of the plurality of data objects and a second data object of the plurality of data objects each have a value for the at least one parameter; determining that the value of the first data object is the same as the value of the second data object; assigning at least one tag to at least one of the first and second data objects to indicate the value; generating at least one vector, the at least one vector comprising the at least one tag and an indication of the data object to which the at least one tag is assigned; and providing the at least one vector as an input to train a neural network.

Optionally, the first and second data objects correspond to musical notes.

Optionally, the parameter is a position, duration, interval or pitch.

Optionally, the neural network is a recurrent neural network.

In another aspect, a computer-implemented method of generating a piece of music is provided. The method comprising the following steps: determining an initial time sequence of notes for the piece of music; determining at least one probability distribution for selecting at least one subsequent note from a set of candidate notes; generating a biasing output based on data of the initial sequence of notes; and extending the initial sequence of notes with at least one subsequent note selected from the set of candidate notes according to the probability distribution and the biasing output, wherein the biasing output biases the selection so as to affect the likelihood of the selection resulting in a repeat of a musical structure element formed by the initial sequence of notes.

Optionally, the steps constitute a current iteration of an iterative music generation process.

In another aspect, a computer-implemented method of extracting musical structure information from a piece of music is provided. The method comprises: receiving the piece of music at a processing stage; processing the piece of music so as to identity therein a set of repeating sections, each repeating section being a repeat of an earlier section of the piece of music; and for each of the set of repeating sections, determining at least one of: a musical duration between the repeating section of music and the earlier section of music, a type of the repeat, and a transposition value between the earlier section and the repeating section.

Optionally, the type of repeat may be one of: a duration repeat, an interval repeat and a duration interval repeat.

In another aspect, a computer-implemented method of extracting musical structure information from a piece of music is provided. The method comprises: receiving the piece of music at a processing stage; and generating a vector for each of a plurality of frames of the piece of music, wherein each frame occurs within a measure of the piece of music, and the vector comprises a strength indicator indicating a musical strength of that frame within that measure, which is determined based on the position of the frame within the measure.

Optionally, the vector may comprise any of the additional vector information disclosed herein.

Optionally, the strength value is a useful indicator of where the frame lies within the piece in a musical context.

Optionally, the strength indicator may indicate a beat strength, a measure strength or a hyper-beat strength, for example.

Optionally, each vector may indicate whether or not the frame is part of a repeating section.

Optionally, for a frame that is or forms part of a repeating section, each vector may indicate at least one of: the type of the repeat, the transposition value, and the musical duration between the earlier section and the repeating section.

Optionally, the piece of music may be one of multiple pieces of music, for which vectors are determined as above, and which are used to train the structure generator. The vector(s) may be used to train the structure generator, as explained below. The structure network can be trained on only the structure dataset and not on the actual pieces of music, or optionally the pieces of music can be used for training as well.

In another aspect, a computer-implemented method of extracting musical structure information from a piece of music is provided. The method comprises: receiving the piece of music at a processing stage; processing the piece of music so as to identity therein a plurality of repeating sections, each repeating section being a repeat of an earlier section of the piece of music; filtering the plurality of repeating sections, to filter-out unwanted repeating sections according to a set of filtering criteria.

Optionally, the filtering may be performed in the manner described below in relation to step s304.

Optionally, the piece of music may be in the form of a musical transcript.

In another aspect, a computer system is provided comprising a data processing stage (in the form of one or more processors, such as CPUs, GPUs etc.) and memory coupled to the one or more processors and configured to store executable instructions, which when executed on the one or more processors cause the one or more processors to carry out any of the steps disclosed herein.

In another aspect, a computer program product is provided comprising executable instructions stored on a computer-readable storage medium, which are configured, when executed on the one or more processors, to cause the one or more processors to carry out any of the steps disclosed herein.

BRIEF DESCRIPTION OF THE DRAWINGS

Embodiments of the invention will now be described, by way of example, with reference to the drawings, of which:

FIG. 7 shows an example probability array.

DETAILED DESCRIPTION

Figure 1:
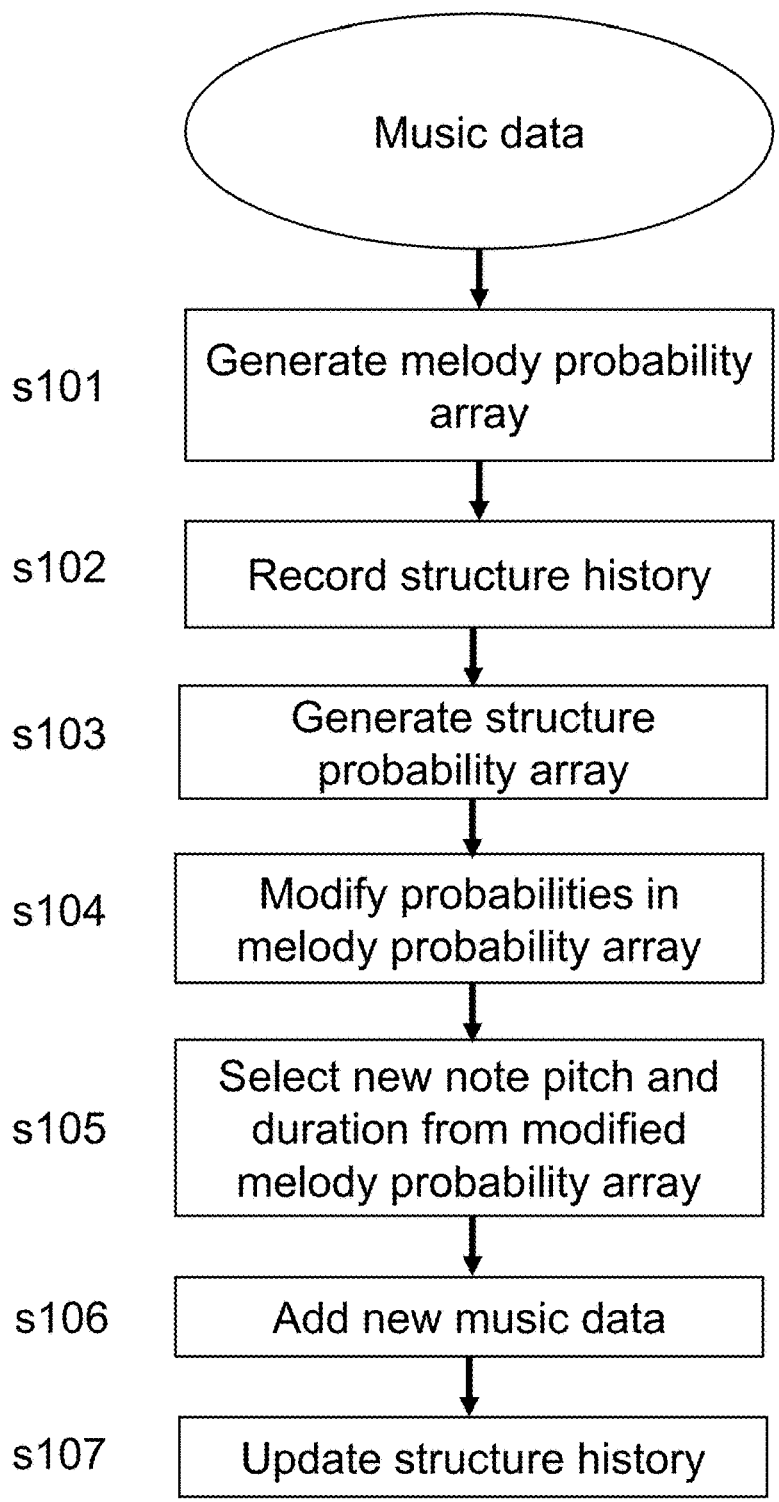
FIG. 1 shows a flow diagram of a method for generating new music data.

Disclosed herein is a method of providing one or more outputs at one or more respective time instants. Particularly, the outputs may be musical notes, either played or stored as data, each note having its own time instant. At least some of the musical notes are generated.

Traditionally, music is composed by a person who is practised in composing music. Such a person composes music based on musical theory and experience in order to compose a piece of music that is aurally pleasing. This is a specialised and time-consuming task. The methods disclosed herein allow music data, corresponding to musical notes, to be generated without requiring input from a person specialised in music composition. To achieve this, probabilities are used to choose notes in a sequence, eventually arriving at a complete sequence of notes that can be regarded as a piece of music.

A first note is selected. This may be selected based on a rule, probabilities, or any other method. For example, the first note could always be the same, or it could be different in each case. Next, a second note is selected. The selection of the second note may be based on the first note. In this case, a probability array may be used to provide an array of probabilities that the second note could be, based on what the first note is. Then, a value for the second note can be selected from the probability array, with certain notes being more likely to be selected than other notes due to such notes having a higher probability. The probability array may be termed a melody array generated by a melody generator.

Beneficially however, a second probability array may also be used in conjunction with the melody array in order to bias the outcome of the second note selection. The second probability array may be termed a structure array generated by a structure generator. Unlike the melody array, the structure array, provides an array of probabilities that some element of the first note is repeated. In other words, the structure generator provides a biasing output to increase the likelihood that some element of the first note is repeated. For example, the structure array may provide a probability that the pitch of the second note is the same as the first note, or that the duration of the second note is the same as the first note. However, any element of the first note could be repeated. The inventors of this application have realised that repetition is an important aspect to make music aurally pleasing and therefore, when the probabilities of the two arrays are used together, the created sequence of notes is more likely to be aurally pleasing since the structure array provides probabilities for repetitions based on the big-picture structure of the sequence of notes. Iterating this forward, the structure array may, for example, provide a high probability that the note to be chosen next has the same duration as a note that was chosen 5 notes ago, or that any other element of that note is now repeated. This probability modifies/biases the probability provided by the melody array such that the probability of the same duration being chosen now is more likely. However, the biasing provided by the structure generator does not completely override the decisions made by the melody generator. Instead, in biases the probabilistic output of the melody generator so that a balance is struck between, on the one hand, respecting the musically-motivated note "suggestions" by the melody generator and, on the other hand, imposing a degree of convincing musical structure.

As previously mentioned, the structure array may provide probabilities for any type of repetition of previous structure. For example, there may be a staccato three bars back, and the structure array may provide a high probability that a staccato be repeated again. Any other repetition type may be provided as a probability in the structure array.

Both the melody and structure generators may generate arrays based on rules. For example, the melody array could always provide a high probability that the pitch of a note to be chosen is one tone higher than the previous note. The structure array could always provide a high probability that the duration of a note to be chosen is the same as (a repeat of) the duration of a note two bars back. Any other rule could be used.

Alternatively, one or both of the melody array and the structure array could be generated using a Probabilistic Sequence Model (PSM). A PSM is a component which determines a probability distribution over a sequence of values or items. This distribution can either be learned from a dataset of example sequences or fixed a priori. By choosing an appropriate dataset or encoding suitable expert knowledge, a PSM can be made to reflect typical temporal structures in the domain of interest, for example, typical chord or note sequences in music.

A PSM can be used to generate sequences according to its distribution by sampling one item at a time from the probability distribution over possible next items given a prefix of items sampled so far. In other words, each item is selected according to a probability distribution of possible items that is generated by the PSM based on one or more of the items that have been chosen already. Because the output of the PSM is probabilistic, this introduces an element of variation whereby the same input can give rise to different outputs.

Examples of PSMs include Markov chains, probabilistic grammars, and recurrent neural networks with a probabilistic final layer (SOFTMAX etc.). For the purposes of providing an example, the case of a using a recurrent neural network (RNN) will be discussed. However, any reference to a neural network discussed herein could be replaced by another kind of PSM, such as those examples provided above. An RNN is a type of neural network for modelling sequences and comprises an input layer, a hidden layer and an output layer. The input and output of the RNN may therefore correspond to the input layer and output layer respectively. The hidden layer may be termed a stateful component having a state. The state acts as a memory of the past information encountered by the RNN while traversing a sequence. At each location in the sequence, the RNN makes use of both the input and the state of the stateful component from the previous location to predict an output. In particular, a Long-Short Term Memory (LSTM) network, which is a type of RNN, may be particularly beneficial in the below embodiments due to the presence of at least one memory cell as part of the stateful component, the at least one memory cell defining the state of the stateful component, thereby providing greater temporal memory than a standard RNN.

Such a hidden layer/stateful component may be termed an LSTM layer, and such layers have been widely used in RNNs to model speech signals, language token sequences and musical sequences. Accordingly, the skilled person would understand how to implement an LSTM network in the context of the below embodiments. As would be understood, given an input vector xt at a sequence location t, the output of the LSTM layer $h_{t-1}$ and its memory cell $c_{t-1}$ (collectively, its state) from the previous location, the output of the LSTM layer $h_t$ is computed and further propagated into another layer (e.g. the output layer) of a larger model.

In the case of the melody generator, the neural network could be trained to determine probabilities for a new note based on specific values for a preceding note. The output layer of the neural network may contain two groups of softmax units, each group modelling a single probability distribution over a set of mutually exclusive possibilities. The first of these denotes the musical pitch of the note, and the second denotes the duration of the note. In the case that the neural network being an LSTM network, given the output of the LSTM layer $h_t$ at any given location tin the sequence, this is transformed into two independent probability distributions $\rho_t$ and $\delta t$ that together make up the output later of the network. From these two distributions, the probability of a certain note (i.e. a certain pitch and duration) can be obtained by simply multiplying the probabilities of its corresponding pitch and duration respectively.

In the case of the structure generator, the neural network could be trained to determine probabilities that an element of any preceding note, or a complete preceding note, occurs again. Again, the output layer of the neural network may also contain two groups of softmax units, however these would represent different quantities that define aspects of structure in particular (as will be explained below). The manner in which these are combined however could be the same as for the melody array described above. The use of neural networks allows the generation of notes to be improved yet further, and to be more aurally pleasing, as the networks may be trained on real music in order to learn the patterns and structures present in real music.

A first aspect disclosed herein is a method of generating new music data as shown in FIG. 1. In particular, the method provides one or more outputs at one or more respective time instants. The outputs may be the playing of musical notes, or the storing of musical notes as music data.

The method may be performed by a processor, wherein the music data is encoded digitally using MIDI format, although any other suitable format may be used, as would be understood. Music data is data describing one or more musical notes, which includes chords and rests.

The steps of FIG. 1 may begin based on existing music data (e.g. an existing piece of music) corresponding to multiple notes, or corresponding to only one musical note. At step s101, a melody array is generated by a melody generator. The melody array comprises an array of probabilities based on the music data. The array of probabilities comprises a list of probabilities that the next note has a certain value for a certain parameter. For example, the array may have a list of probabilities for the pitch of the next note.

At step s102, a structure history is recorded. The structure history is a list of values relating to the existing music data. This step may take place before step s101, or indeed at the same time as step s101.

At step s103, a structure probability array is generated by a structure generator. The structure probability array comprises a list of probabilities that an element of the existing structure, provided by the structure history, is repeated.

At step s104, the probabilities of the melody probability array are modified/biased by the probabilities of the structure probability array, to provide a modified/biased probability array.

At step s105, one or more values of one or more parameters for the new note are selected based on the probabilities provided by the modified/biased probability array.

At step s106, new music data is generated, the new music data corresponding to the selected new note.

At step s107, the structure history of step s102 is updated. The process of FIG. 1 may be repeated thereafter by repeating a selection of the steps of FIG. 1, as will be described below.

The steps of FIG. 1 will be described in more detail below.

Structure Probability Array

A structure probability array is an array (similar to a list or table of data) comprising structure tags and associated probability values. Tags will be explained in detail below. The structure probability array may have only one tag, or it may have more than one tag, for example combinations of tags. Each tag or combination of tags has an associated probability value.

The probability value is the probability that a new note has the associated tag or combination of tags, as will be explained.

The structure probability array may be generated in a number of ways. For example, the structure probability array could be based on a predefined rule. The predefined rule may state that the probability of the new note having a duration equal to a crotchet (duration=1) is 0.5, and the probability of the new note having a duration equal to a quaver (duration=0.5) is also 0.5. In this example, the probability of the duration of the new note being a crotchet or a quaver is equal, however any other rule could be used and may include any musical note duration with any probability.

Alternatively, the structure probability array may be generated using a structure generator, where the structure generator is a neural network, such as a recurrent neural network that has been trained to generate a probability value associated with a tag or combination of tags based on a vector, for example a binary vector, the neural network being having been trained on music data.

Training a Structure Neural Network

In the case that the structure generator is a neural network, such a neural network must be trained in order to be able to provide an appropriate output based on input data. A neural network is trained on pre-existing data and then, once trained, may be used to provide an appropriate output based on a new data input. Such a trained neural network may be used to determine a probability associated with a new object being the next object in a series of objects, based on a preceding series of objects. Accordingly, in this case, the structure neural network is trained using a pre-existing series of objects in order to be able to determine a probability associated with a new object to be added to the series.

The purpose of the training is to provide a trained structure neural network that is able to provide one or more probabilities that the next, new object is expected to be a repeat of a preceding object in the series. What constitutes an expected repeat in this context is knowledge gained by the structure neural network in training, which is encapsulated in a set of model parameters of the structure neural network that has been learned from a set of musical structure training data. That is, the structure neural network learns, from this training data, how musical structure is created through repeating structure elements in the type of music represented by this training data. That is, the structure neural network learns what constitutes expected (musically convincing) musical structure from its training data, and applies that knowledge to the music generation task based on the sequence of notes that has been determined so far. The musical structure neural network can be taught about musical structure for different types/genres of music by providing training data representative of the desired type/genre of music.

Figure 2:
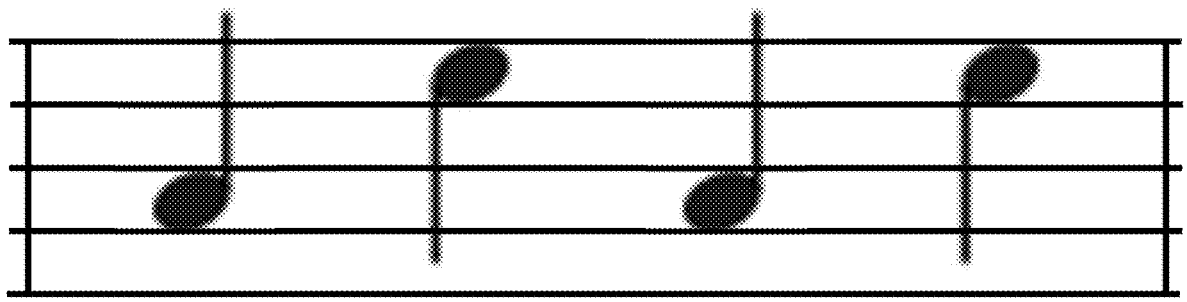
FIG. 2 shows a musical score comprising four crotchets.

Accordingly, the structure neural network is first trained using training data. In this case, the training data is music data since the structure neural network is being used to determine one or more probabilities relating to musical notes. Such training data may be regarded as a piece of music for processing, and as such the training data may be regarded as being received by the neural network at a processing stage. FIG. 2 illustrates a measure or bar of music 201 comprising four crotchets 202 to 205, which is an example of music data represented visually using conventional modern musical notation. Throughout this disclosure, the words "measure" and "bar" will be used interchangeably. The training data is converted into a plurality of training vectors using the steps of FIG. 3, described below, and the training vectors are then processed by the structure neural network in order to train it.

The conversion of training data into a plurality of training vectors, as set out in FIG. 3 below, is an important and unique step. However, once the training data has been converted into a plurality of training vectors, it should be noted that there are many ways in which the structure neural network may process these training vectors, as would be understood, in order to be considered a "trained" structure neural network. One example way would be to use stochastic gradient descent to minimise a given cost function between subsequent vectors, as is known in the art.

Figure 3:
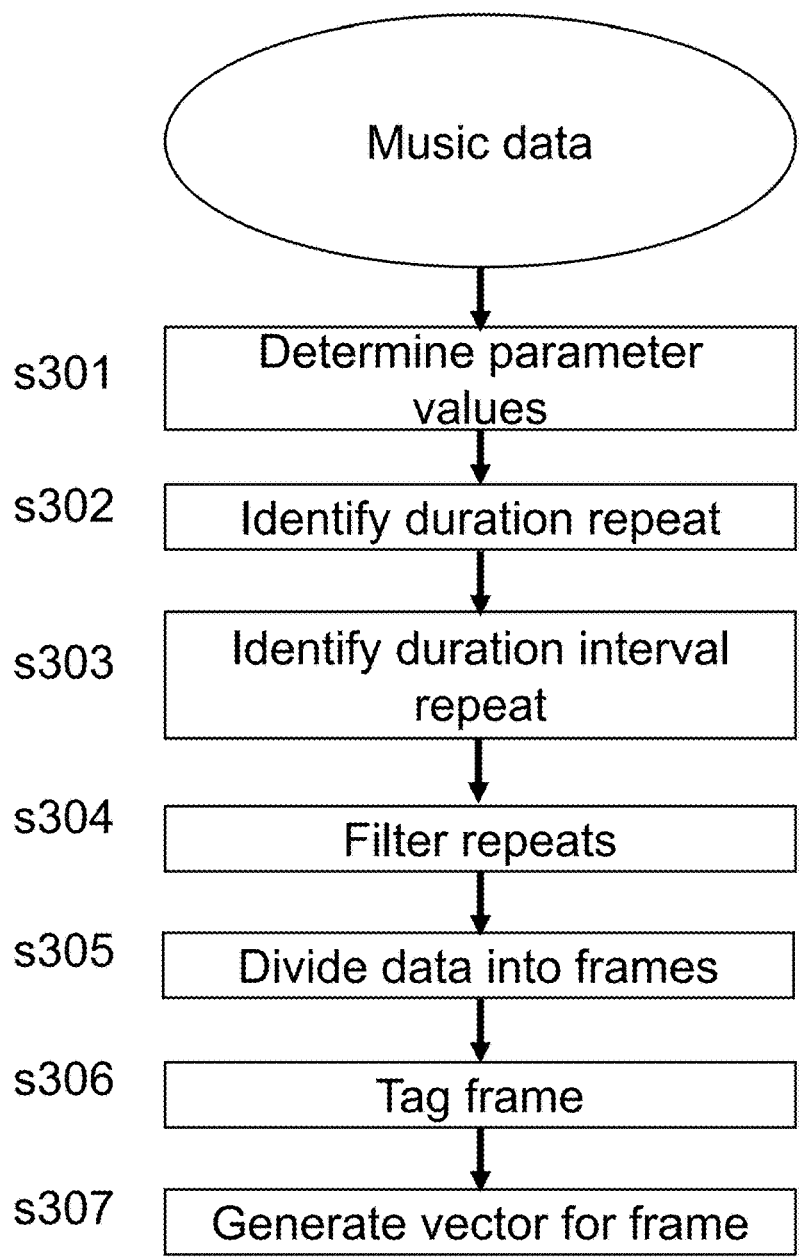
FIG. 3 shows a flow diagram for a method of generating a vector based on music data.

FIG. 3 illustrates a flow diagram of a method of generating one or more vectors from music data, the vectors being training vectors used as an input to train a neural network. FIG. 3 is an embodiment that provides vectors to train a neural network to identify duration repeats, i.e. repeats of note duration, or duration interval repeats, i.e. repeats of a note duration and interval from a previous note, as will be explained below. Alternatively however, the vectors could be used to train a neural network to identify any other type of repeat in the music data.

For example, any process that is able to identify repetition of structure, by marking a note or sections of notes as being a repetition of any element of a previous note or section of notes for example, may be used. As previously discussed, the element could be a note duration, note pitch, note articulation, note dynamic or similar.

It should also be noted that the steps of FIG. 3 may be altered and the specific steps discussed below are not essential. Indeed, any process that is able to convert existing music data into a list of vectors, the list of vectors providing structural information, may be used as an input to train a neural network.

Music data is first provided, and the music data is then processed to determine at least one parameter for each note of the music data, each parameter having a value. Example parameters are note type, note duration, note pitch, note interval, note position, or any other parameter depending on the desired outcome of the training. The steps of FIG. 3 will now be described in detail, with reference to these example parameters.

Determining Parameter Value of the Music Data, s301

At step s301, parameters and associated values of each note in the music data are determined, and each note is labelled with the parameter values. In this example, one parameter is a duration, and a duration value, corresponding to the duration of the note in multiples of a crotchet (e.g. if the note is a quaver it is given a duration value of 0.5 and if it is a minim it is given a duration value of 2), is determined. The duration could be measured in terms of any other fixed duration, such as multiples of a quaver. Other example parameters discussed below are pitch, interval and position.

Optionally, an interval value of the interval parameter is also determined for each note in the music data. If the note being labelled is immediately preceded by another note, the interval value corresponds to the difference in pitch between the note being labelled and the immediately preceding note. The labelling of notes includes labelling rest notes (known simply as "rests" in conventional musical terms), which also have a duration value, as would be understood. However, rest notes do not have a pitch or interval value. If the note being labelled is immediately preceded by a rest note, then the interval value of the note corresponds to the difference in pitch between the note being labelled and the note immediately preceding the rest note. If the immediately preceding note also does not have a pitch value (i.e. is also a rest note), then the next immediately preceding note is used.

The labelling of intervals may be based on the number of scale degrees between the note being labelled and the immediately preceding note. For example, the major scale in western music, in the key of C major, comprises the notes C, D, E, F, G, A and B. These notes have the scale degree numbers 1, 2, 3, 4, 5, 6 and 7, respectively. Let it be assumed that the music data is in C major, and the note being labelled has a pitch class of A (scale degree 6) and the immediately preceding note has a pitch class of F (scale degree 4). The interval value is the value of the scale degree of the note being labelled minus the scale degree of the immediately preceding note. Therefore, in this instance the interval value is +2. If the note being labelled has a pitch class of A (scale degree 6) and the immediately preceding note has a pitch class of B (scale degree 7), the interval value would be −1.

In this instance, any pitch that is not included in the major scale in the key of C major may be approximated to one of the pitches included in the major scale. For example, let it be assumed that the note being labelled has a pitch class of A (scale degree 6) and the immediately preceding note has a pitch class of F # (which is not a scale degree in the key of C major). The pitch class of F #may be approximated to a pitch class of F (scale degree 4), since that is the nearest pitch class in the major scale in the key of C major. Therefore, in this instance the interval value would be +2.

Alternatively, the labelling of intervals may be based on the number of tones or semitones between the note being labelled and the immediately preceding note. For example, the interval value may be based on the number of semitones between the two notes. Therefore, in the above case, the number of semitones between the A and the F #is +3, since these notes are three semitones apart. Of course, any system of defining intervals between notes may be used.

Each note of the music data has a position value. Note position is defined herein by the duration from the start of the music data up to the start of the note, in multiples of a crotchet. For example, the position of the first note in a piece of music is 0 (assuming no other musical characters precede the first note) and the position of a crochet that is the last note in a piece of music comprising four bars in 4/4 time is 15.

Let it be assumed that the measure or bar of music 202 in FIG. 2 is the first bar of music in the key of C major. Table 1 below lists the position value, pitch, duration value and interval value of each crotchet 202 to 205 in FIG. 2.

TABLE 1

| Crotchet | Position | Pitch | Duration | Interval |
| --- | --- | --- | --- | --- |
| 202 | 0 | A4 | 1 | Null |
| 203 | 1 | E5 | 1 | +4 |
| 204 | 2 | A4 | 1 | −4 |
| 205 | 3 | E5 | 1 | +4 |

Although the music of FIG. 2 only shows pitched notes, the same methods disclosed herein could be applied to music having rest notes (known as "rests" in musical terms) or chords. A rest note would have a pitch of "null". A chord is a plurality of musical notes arranged to be played or output at the same time instant, as would be understood. A chord could be labelled based on only one of the notes of the chord, for example the musically lowest note, or the multiple pitches of each chord could be labelled in a single row entry.

Identifying Repeats, s302

Next, one or more repeats, if present, is identified. In this example, the first type of repeat to be identified will be referred to as a duration repeat. A duration repeat is a repeat of a note (of any pitch) having the same duration as a preceding note, or indeed it could be a repeat of a rest note (i.e. a note having a null pitch value). A duration repeat may also be a repeat of a series of notes having the same duration as a series of preceding notes, the duration of each note in the repeat being the same as a corresponding note in the preceding series. As mentioned above however, any other type of repeat could be identified, and durations repeats are discussed here as one kind of repeat. In the example being discussed, the notes in the series of notes are directly adjacent notes, and may include rest notes. The preceding note or notes may be immediately preceding, or may be at any other earlier point in the music. The note or notes of the duration repeat will be referred to as the repeat note or repeat notes, as appropriate. The preceding note or notes of which the duration repeat is a repeat will be referred to as the original note or notes.

As a first option, the pitches of the repeat note(s) are not taken into consideration when identifying a duration repeat. That is to say that if a note having a duration of 1 is repeated, and the repeat note also has a duration of 1 but has a different pitch, the repeat is still a duration repeat.

Alternatively, as a second option, whether the original note(s) is a rest note or a note having a pitch (of any value) may be taken into account. For example, if a first note is a rest note with a duration of 1 (and no pitch value), and a later, second note is a crotchet with a duration of 1 (and a pitch value), the second note may not be regarded as a duration repeat even though both notes have the same duration. The aural interpretation of a rhythm which is associated with something playing (note having a pitch value) or not playing (note being a rest note, no pitch value) is very different. Therefore, by taking into consideration whether the original note has a pitch value or not (i.e. whether the note is a rest or not), the identification of duration repeats is improved.

Optionally, duration repeats of a single original note may be ignored, and a threshold number of original notes may be required. For example, only duration repeats that are a duration repeat of a series of at least two original notes may be identified. The threshold number of original notes could be any number and predefined at the outset.

At step s302, a duration repeat in the music data is identified, if present. Optionally, more than one duration repeat or all duration repeats in the music data may be identified.

Each note identified in the music data is considered in turn. With reference to FIG. 2, let us first consider the crotchet 202 listed in Table 1. The duration of this note (a single crotchet=1) is repeated three times in bar 201. These three repeats are therefore three separate duration repeats of the crotchet 202, each duration repeat having a different position (see Table 2 below). The duration in this example is quantified in terms of crotchets beats, which for a 4/4 bar is 4 beats. However, any other method of quantifying the duration may be used, such as quaver beats or semiquaver beats.

A duration repeat is defined by a repeat position value, a look-back length and a repeat duration. The repeat position value is defined as the position value of the first repeat note. The look-back length is the difference between the position value of the first repeat note and the position value of the original note. Generally speaking, a look-back length may be regarded as the musical duration between a repeating section of music and an earlier section of music, the earlier section of music being the section of music on which the repeat is based. The repeat duration is equal to the note duration of the original note. Alternatively, in the case of a duration repeat being a repeat of a series of original notes, the repeat duration is equal to the summed duration of all of the notes in the original series of notes. Examples of a repeat position value, a look-back length and a repeat duration for a duration repeat will now be given with reference to FIG. 2.

The first duration repeat of crotchet 202 occurs at crotchet 203. This duration repeat has a repeat position value of 1, a look-back length of 1 and a repeat duration of 1.

For example, all duration repeats of the music data of FIG. 2, and their duration repeat position values, look-back lengths and repeat durations, are shown in Table 2 below. The crotchets 202 to 205 that correspond to each duration repeat are also indicated, although this information is derivable from the repeat position values, look-back lengths and repeat durations and so does not need to be recorded.

TABLE 2

| Position | Look-back length | Repeat duration | Repeat notes → original notes |
|---|---|---|---|
| 1 | 1 | 1 | 203→202 |
| 2 | 2 | 1 | 204→202 |
| 3 | 3 | 1 | 205→202 |
| 2 | 1 | 1 | 204→203 |
| 3 | 2 | 1 | 205→203 |
| 3 | 1 | 1 | 205→204 |
| 2 | 2 | 2 | (204, 205)→(202, 203) |

If no duration repeats are present in the music data, no duration repeats are identified.

All identified duration repeats are added to a list of repeats.

The term "repeat" as used herein is not limited to a specific type of repeat of FIG. 3. In general, any element is considered as a repeat of an earlier element if those elements match each other, according to whatever matching criteria are applied. For example, in addition or instead of the duration repeat of a note or series of notes described above, the repeat may be a repeated pitch or series of pitches, or indeed a repeat of any other kind of musical element. Thus, in this context, a repeat of a musical element means a musical element that matches an earlier musical element according to those matching criteria.

For example, a pattern detection algorithm such as SIATEC or COSIATEC could be used.

Identifying Duration Interval Repeats, s303

At optional step s303, duration interval repeats are identified. In a first embodiment, a duration interval repeat is a duration repeat in which the interval values of every repeat note (excluding the first repeat note) is the same as, and in the same order as, the interval values of the corresponding original note(s). Since duration interval repeats depend on the relations between notes in this way, duration interval repeats must comprise at least two notes. For example, the series of crotchets 204-205 is a duration repeat of the series of crotchets 202-203. In additional, this duration repeat is also a duration interval repeat as both crotchets 203 and 205 have an interval value of +4. This is true even though the interval value of the crotchet 202 is null and the interval value of the crotchet 204 is −4, since the interval value of the first repeat note (crotchet 204 in this case) is not taken into account when identifying duration interval repeats.

Alternatively, in a second embodiment, the interval value of the first repeat note may be taken into account when identifying duration interval repeats. In this case, the interval value of the first repeat note may have to be equal to the interval value of the first original note, such that the interval value of every repeat note, including the first repeat note, is the same as, and in the same order as, the interval values of the corresponding original notes. In the example of FIG. 2, no duration interval repeats would be identified in this case.

Similarly to a duration repeat, a duration interval repeat is defined by a repeat position value, a look-back length and a repeat duration.

Regarding a duration repeat of a series of original notes, each repeat note (except the first repeat note in the case of the first embodiment above) may have to have the same interval value as its corresponding note in the series of original notes for the duration repeat to be a duration interval repeat.

As an example of the first embodiment, the pair of crotchets 204 and 205 that are repeat notes repeating the pair of crotchets 202 and 203 are a duration repeat and a duration interval repeat, as previously discussed. Crotchet 204, corresponding to original crotchet 202 in this instance, has an interval value of −4 while crotchet 202 has an interval value of null. However, crotchet 204 is the first repeat note and therefore a mismatch of interval value is ignored in the first embodiment. The fact that crotchets 203 and 205 have the same interval value (+4) is sufficient to make this duration repeat a duration interval repeat.

Optionally, a duration interval repeat may be further defined by an interval transposition value. The interval transposition value, like some of the other values discussed herein, may take one of two values: true or false. A value of true indicates that the condition is satisfied (in this case, true indicates that the duration interval repeat has an interval transposition), and a value of false indicates that the condition is not satisfied. If the first repeat note of a duration interval repeat has the same pitch as the corresponding note that is repeated, then the duration interval repeat is given an interval transposition value of false, as the first repeat note is not transposed up or down relative to the corresponding original note. Necessarily, if the repeat is a duration interval repeat and the transposition value is false, the second and all other repeat notes of the duration interval repeat must also not be transposed up or down relative to their corresponding original notes. Otherwise, the duration interval repeat is given an interval transposition value of true.

Alternatively, the interval transposition value could also be represented by a number, the number being the number of tones, semitones or scale degrees of the transposition. For example, an interval transposition value of +5 could represent a 5 semitone transposition between the first original note and the duration interval first repeat note. Following this example, an interval transposition value of 0 could indicate that there is no transposition of the duration interval repeat.

If no duration interval repeats are present in the music data, no duration interval repeats are identified.

All duration interval repeats are added to the list of repeats before moving to the next stage.

Table 3 below lists the position value, look-back length, repeat duration and interval transposition value of the only duration interval repeat present in the music data of FIG. 2.

TABLE 3

| Position | Look-back length | Repeat duration | Interval repeat transposition | Repeat notes → original notes |
|---|---|---|---|---|
| 2 | 2 | 2 | False | (204, 205)→(202, 203) |

In practice, identifying duration repeats and duration interval repeats may be achieved by converting labelled music data into a string and identifying sub-strings that are duration repeats and duration interval repeats within the string, as would be understood. For example, a sequence of notes of the music data may first be converted into two strings, one corresponding to durations and the other to intervals. In each of these strings, a string matching algorithm may be used to find substrings that repeat. Single-note repeats may be discarded, depending on preferences, and only those repeats corresponding to certain lookbacks may be retained, as explained. Optionally, a maximum note duration may be set, and any notes longer than this may be split into multiple notes of the same pitch. For example, the maximum note duration may be two beats. This optional step serves to limit the number of characters required to represent the music data as a string.

The outcome of s304 is that every possible duration repeat and duration interval repeat, for every note in the music, is identified. Optionally, instead of identifying every possible duration repeat and duration interval repeat, only those repeats having a certain look-back length may be identified at this stage. For example, in the case that only pre-defined look-back lengths of 2 and 4 are permitted, any repeat that has a look-back length other than 2 or 4 may be discarded. This step may occur at another point in the process however, as will be discussed. As previously mentioned, any other type of repetition in the music structure could be identified, and the above method is not limited to a specific repeat type.

Repeat Filtering, s304

At optional step s304, certain unwanted duration repeats and duration interval repeats are deleted from the list of repeats according to a set of filtering criteria. This process is referred to a repeat filtering. Repeat filtering serves two purposes: first, repeats with certain undesired characteristics, such as look-backs deemed less musically important by the inventors of this application, can be removed; second, repeat filtering can optionally also be used to ensure that each position in the music data only corresponds to, at most, a single repeat type, which can simplify the data and thus make it easier and faster for the neural network to process. Therefore, for example, repeats with longer repeat durations and look-back lengths may be retained over repeats with shorter repeat durations and shorter look-back lengths. By keeping repeats with longer repeat durations and look-back lengths over those with shorter repeat durations and shorter look-back lengths, more repeat information can be captured since more notes will be tagged as being part of repeats. By capturing more repeat information, the training of the neural network may be improved.

Figure 4:
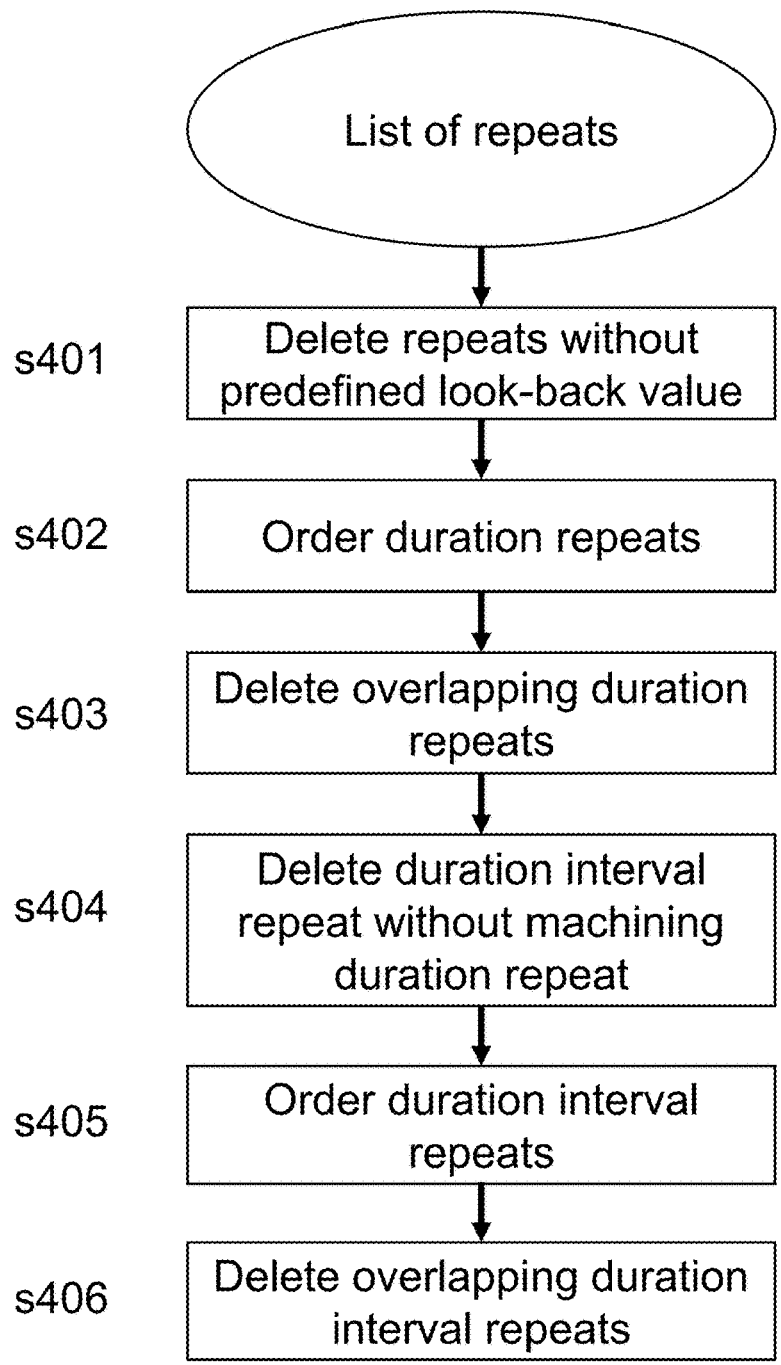
FIG. 4 shows a flow diagram for a method of filtering repeats.

FIG. 4 is a flow diagram illustrating the steps of a method of repeat filtering.

At step s401, duration repeats and duration interval repeats that do not have one or more predefined look-back lengths are deleted from the list of repeats. In this case, the filtering criteria therefore includes one or more look-back lengths.

The predefined look-back lengths may be chosen using a number of methods. For example, the predefined look-back lengths may be chosen because they are common to a specific genre or time signature of music. Thus, only predefined look-backs are considered, reducing the number of computations required to generate music and also improving the quality of the generated music. For example, for a piece of music in 4/4 time, predefined look-back lengths may be 0.5, 0.75, 1, 1.5, 2, 3, 4, 8 and 16, which would result in repeats that make musical sense based on the 4/4 time signature.

As an example, let it be assumed that the predefined look-back lengths are 1 and 2 only.

Accordingly, and with reference to the list of repeats identified from the music data of FIG. 2, the duration repeat corresponding to crotchet 202 being repeated at crotchet 205, which has a look-back length of 3, is deleted from the list of repeats as a look-back length of 3 is not one of the predefined look-back lengths.

At step s402, the duration repeats in the list of repeats are ordered highest to lowest in respect of repeat duration followed by look-back length.

For example, applying steps s401 and s402 to the duration repeats of Table 2 gives the order of look-back lengths and repeat durations shown in Table 4 below (assuming that the predefined look-back lengths are 1 and 2 only).

TABLE 4

| Position | Look-back length | Repeat duration | Crotchets in repeat |
|---|---|---|---|
| 2 | 2 | 2 | (204, 205)→(202, 203) |
| 3 | 2 | 1 | 205→203 |
| 2 | 2 | 1 | 204→202 |
| 2 | 2 | 1 | 204→203 |
| 3 | 1 | 1 | 205→204 |
| 1 | 1 | 1 | 203→202 |

At optional step s403, overlapping duration repeats are deleted. Such overlapping duration repeats may be partially overlapping, and may also include duration repeats completely contained within another duration repeat. Deleting overlapping duration repeats comprises deleting all duration repeats in the list that have at least one repeat note that is also a repeat note that is part of a duration repeat higher up in the ordered list. Certain overlapping duration repeats may be deleted by removing duplications in repeat position value from the list, the entry lower down in the list being deleted. Many other ways could be used to remove repeat overlaps such that there are no, or fewer, overlaps present. For example, applying step s403 to Table 4, all duration repeats except the duration repeats corresponding to crotchets (204, 205)→(202,203) and 203→202 are deleted.

At step s404, duration interval repeats in the list of repeats that do not have a matching duration repeat are deleted. A given duration interval repeat has a matching duration repeat if: the list of repeats comprises a duration repeat with a duration repeat look-back length equal to the duration interval repeat look-back length, the repeat durations are equal, and all of the duration interval repeat notes are also repeat notes of the given duration repeat.

Optionally, steps s405 and s406 may then follow. At step s405, the duration interval repeats in the list of repeats are ordered highest to lowest in respect of duration interval repeat duration, followed by duration interval repeat position value, followed by duration interval repeat look-back length.

At step s406, overlapping duration interval repeats are deleted. This may be achieved using the same techniques as those used above in step s403 for duration repeats, or any other method may be used such that overlapping duration interval repeats are deleted.

Although look-back length is used as an example filtering criteria, other filtering criteria may be used depending on a desired outcome.

The list of repeats is then stored for use in the next stage.

Division of Music Data into Frames, s305

Returning to FIG. 3, at step s305 the music data, after every note of the music has been assessed to determine whether it is part of a duration repeat, a duration interval repeat or free music, is divided into 'frames'.

The music data exists in bars of music, where all bars have a fixed bar duration based on the time signature of the music data, as would be understood. Optionally however, the music data may include bars of music having different bar lengths. A frame is a segment or portion of a bar of music, where all frames have the same fixed frame duration. Specifically, in this example each frame has the duration of a semiquaver, although the duration may be shorter or longer e.g. a demisemiquaver or quaver, respectively. When the frame duration is a semiquaver, a bar of music in 4/4 time comprises sixteen frames, as would be understood.

Figure 5:
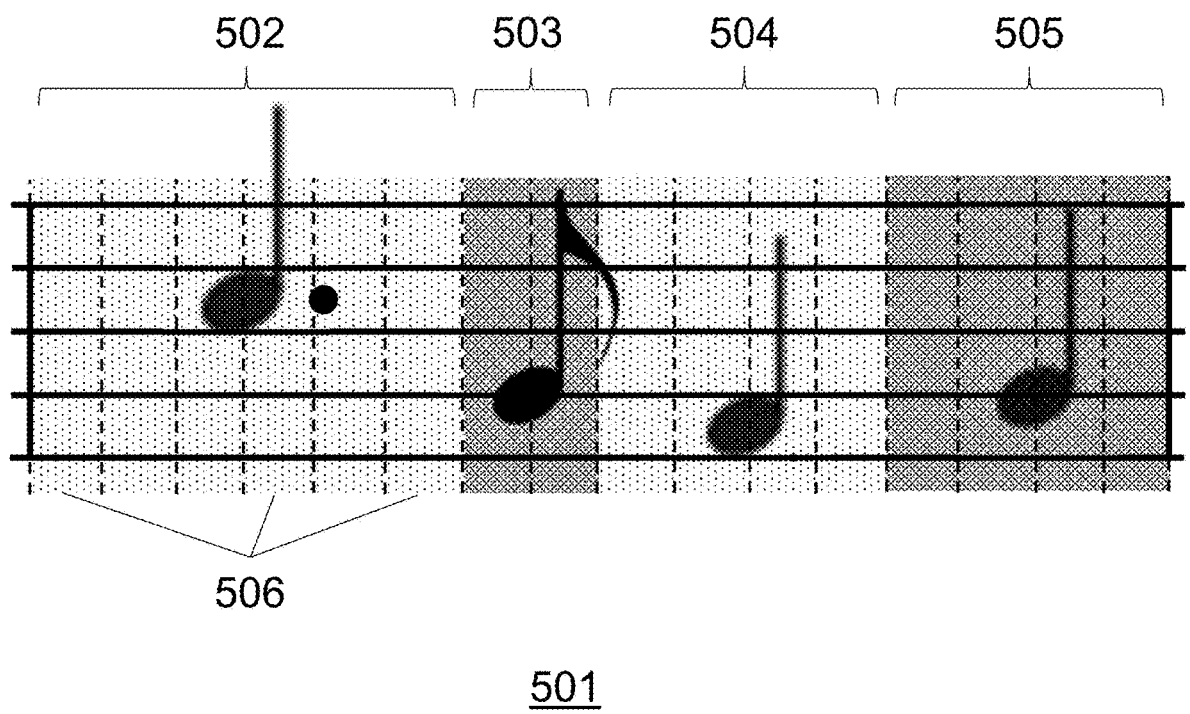
FIG. 5 shows a musical score divided into frames.

Each frame overlaps with a note (which could be a rest note) of the music data. The overlapping note is the note associated with the frame. For example, FIG. 5 illustrates a bar of music 501 in 4/4 time that has been divided into sixteen frames 506 separated by dashed lines. The bar of music comprises four notes: a dotted crotchet, followed by a quaver, followed by a first crotchet, followed by a second crotchet. The bar is also divided into groups of frames 502 to 505, where the frames of each group of frames are associated with one of the notes. As can been seen, the group of six frames 502 corresponds to the duration of the dotted crotchet, the group of two frames 503 corresponds to the duration of the quaver, the group of four frames 504 corresponds to the duration of the first crotchet and the group of four frames 505 corresponds the duration of the second crotchet.

Each frame has a position tag value defining its position relative to the music data. This is determined by the start time of the frame, relative to the start of the piece of music, in multiples of a crotchet. For example, the first frame has a frame position tag value of 0; the second frame, assuming a frame duration of a semiquaver, has a frame position tag value of 0.25; and the first frame of the second bar, assuming 4/4 time, has a frame position tag value of 4. The timing could be in multiples of other fixed note durations, for example multiples of a quaver.

Frame Tagging, s306

At step s306, each frame is tagged with the data accumulated in steps s301 to s305.

A frame is tagged with the following data:

1) A duration repeat tag and a look-back tag. If the note associated with the frame is the repeat note of a duration repeat, as determined by the list of repeats after repeat filtering, the frame is given the duration repeat tag "true" and a look-back tag equal to the look-back length of the associated note. Otherwise, the frame is given the duration repeat tag "false" and a null value look-back tag.

2) Optionally, a duration interval repeat tag. If the note associated with the frame is also the repeat note of a duration interval repeat, the frame is given the duration interval repeat tag "true". Otherwise the frame is given the duration interval repeat tag "false".

3) Optionally, a transposition tag. If the duration interval repeat tag is "true" and the associated note has the interval transposition value "true", then the frame is given the transposition tag "true". If the duration interval repeat tag is "true" and the associated note has the interval repeat transposition value "false", then the transposition tag is set to "false". Otherwise the transposition tag is set to a null value.

A frame that has a duration repeat tag set to "false" is a frame that corresponds to a note that is considered not to be part of a repeat in the music data. Such a note is known as free music.

As mentioned, in the case that the neural network will be used to provide probabilities for the repetition of other structure features, the specific tags assigned would be different. For example, if the neural network will be used to identify the repetition of certain articulation, the tags could be a staccato tag, legato tag, accent tag or any other tag, again with values of true or false. Any type of repetitive structure could be identified base on a tagging of that repeated structure.

Generate Vector, s307

At step s307, one or more vectors are generated to represent the tags of step s306 in vector format. Each frame is represented by a single vector.

Each vector may be a long vector split into subvectors. In other words, each vector may be a concatenation of a plurality of subvectors. Each subvector may be a one-hot subvector. Each subvector contains the frame tags of step s306, as appropriate.

For example, the first subvector may be given by:
[f d, $di_{tr}$, $di_{nt}$]
wherein each bit of the first subvector indicates which of the following four categories a given frame of music belongs to: (1) f—free music, (2) d—duration repeat, (3) $di_{tr}$—duration-interval repeat with transposition, (4) $d_{int}$—duration interval repeat without transposition. As mentioned above, identifying transposition may be optional, and in which case (3) would become di—duration-interval repeat. In addition, the first subvector may only indicate categories (1) and (2), i.e. whether the frame of music is free music or a duration repeat.

An example second subvector may be given by:
[f, $1_{0.5}$, $1_{0.75}$, $1_{1.0}$, $1_{1.5}$, $1_{2.0}$, $1_{3.0}$, $1_{4.0}$, $1_{8.0}$, $1_{16.0}$]
and contains bits that indicate the look-back length. In this case, look-back lengths of 0.5, 0.75, 1.0, 1.5, 2.0, 3.0, 4.0, 8.0, 16.0, quantified in terms of crotchets, are used as these are appropriate for music with a 4/4 time signature. However, any look-back length may be used and any number of different look-back lengths may have associated bits. Indeed, the second subvector may only contain a single bit to indicate a single look-back length (e.g. [f, $1_{2.0}$]).

Optionally, a third subvector may also be included relating to the "beat strength" of the frame. "Beat strength" may therefore also be regarded as "frame strength". Beat strength is used to describe the "strength" of that particular frame in a musical context. In musical theory, different beats in a bar have different musical strengths, as would be understood. For example, in a bar divided into sixteen semi-quaver frames, the first beat (frame) is the strongest, the ninth beat is the next strongest, beats 5 and 13 are the next strongest, beats 3, 7, 11 and 15 are the next strongest, and the remaining even-numbered beats are the weakest. This determination of stronger and weaker beat strength is based on established musical theory and varies depending on the length and time signature of a bar.

To further illustrate this concept, two specific examples are considered for a 4/4 bar containing 16 semiquavers.

Example 1: Based on a Fixed Beat Strength of the Bar

In this case, every 4/4 bar has the same sequences of beat strength, normally one value for the first beat (1st frame), e.g. 0, one value for the 3rd crotchet beat (9th frame), e.g. 1, one value for the 2nd and 4th crotched beats (5th and 13th frames), e.g. 2, and the same sequence for the semiquavers in between (4 3 4 in this case). This will result in a sequence like this for every bar (on a strength scale of 0 to 4, 0 being the "strongest" beat):
0 4 3 4 2 4 3 4 1 4 3 4 2 4 3 4
This is to reflect the fact that, for the four crotchet beats of a 4/4 bar, the metrical strength is as follows:
STRONG (0) weak (2) HALF-STRONG (1) weak (2)

Example 2: Hyper-Beat Strength (Hyper BS)

This is a combination of the beat strength described above (fixed beat strength), and the concept of each bar having its own overall strength value. The result is that the beat strength value of each frame is adjusted due to the influence of a "bar strength". In particular, the first frame of each bar is changed to be equal to the bar strength for that bar, and the remaining frames are also adjusted.

The bar strengths for an 8-bar cycle may be, for example:

| Bar Number | 1 | 2 | 3 | 4 | 5 | 6 | 7 | 8 |
|---|---|---|---|---|---|---|---|---|
| Bar Strength | 0 | 3 | 2 | 3 | 1 | 3 | 2 | 3 |

Using the method below, the resultant hyper-beat strength for each frame in the first bar will therefore result in:

| Semiquaver | 1 | 2 | 3 | 4 | 5 | 6 | 7 | ... | 16 |
|---|---|---|---|---|---|---|---|---|---|
| Hyper BS | 0 | 7 (4 + 3) | 6 (3 + 3) | 7 | 5 | 7 | 6 | ... | 7 |

The reasoning for this will now be explained. Put another way, in addition to beat strength within an individual bar, the notion of a bar strength or "measure strength" is introduced, which extends the concept of beat strength to bars themselves. For example, for bars divided into 16 semi-quavers, such that the 16 frames in the bar would have beat strengths 0 4 3 4 2 4 3 4 1 4 3 4 2 4 3 4 respectively, the same idea may be applied. For example, to generate melodies of duration 8 bars, these 8 bars will have bar strengths 0 3 2 3 1 3 2 3. To combine these two features into a single encoding indicating where the frame lies within a series of 8 bars (bar strength), as well as where it is within the 16 frames of each bars (beat strength):
1. Encode the first frame of each bar with the bar strength;
2. Encode every other frame of the bar by offsetting the beat strength of each frame by the maximum bar strength value of the bars in question, i.e. 3 in this case.

So, for the first bar, the hyper-beat strengths (combination of bar strength and beat strength) will be:
0 7 6 7 5 7 6 7 4 7 6 7 5 7 6 7
. . . and for the second bar, they will be:
3 7 6 7 5 7 6 7 4 7 6 7 5 7 6 7
. . . and for the third bar:
2 7 6 7 5 7 6 7 4 7 6 7 5 7 6 7
. . . and so on.

Therefore, the hyper-beat strength method equates the first frame of each bar to the same value as the bar strength for that bar, and then offsets all other frames of each bar by the maximum value of the bar strength for the bars in that bar-cycle. In the case of the 8-bar cycle above, the maximum bar strength value is 3, and therefore the beat strength value of all frames (other than the first frame of each bar) is increased by 3. Note that these are just illustrative and non-exhaustive examples of how to encode the beat strength and bar strength together, and the bar strengths, maximum bar strength, and beat strengths used may be different.

Although the above example shows the bar strength value being applied to every bar in the cycle, the bar strength may only affect a subset of the bars of the cycle. For example, taking an 8-bar cycle, a bar strength value between 0 and 3 may be used for bars 1 and 2, and for the rest of the bars of the 8-bar cycle (e.g. bars 3+) the usual beat strengths could be used as they are.

Assigning the vector to a frame within a bar of a piece of music, wherein the vector comprises a strength value denoting a strength of that frame, also has applications in other contexts, such as training a melody generator or other ML-based musical information generator.

A plurality of the vectors output at step s307 are used as an input for the neural network to train the neural network, as previously discussed.

In practice, many different sets of music data would be used to train the neural network so that the neural network is more well-trained. The neural network could be specific to a certain genre or style of music by only training the neural network on that genre or style of music, or the neural network may be trained on different genres and styles of music. The neural network could be trained to identify any kind of repetitive structure that could be found in music.

A more complicated example of the steps of FIG. 3 will now be described in relation to FIG. 6. First, parameter values for each note of the music data are determined and labelled (step s301). Next, all duration repeats and duration interval repeats are identified (steps s302 and s303). The series of notes 606, 607 and 608 is repeated by the series of notes 612, 613 and 614. The series of notes 612, 613 and 614 is therefore a duration repeat. This duration repeat has a duration of 5.5, a position value of 8 and a look-back length of 8. In the example music data of FIG. 6, there are other additional duration repeats. Note 607 is a duration repeat of note 606, with a duration of 2, a position value of 2 and a look-back length of 2. Note 611 is a duration repeat of note 610, with a duration of 1, a position value of 7 and a look-back length of 1. Note 612 is a duration repeat of both note 607 and note 606, with a duration of 2, a position value of 8 and respective look-back lengths of 6 and 8. In additional, note 613 is a duration repeat of each of notes 612, 607 and 606. Note 614 is a duration repeat of note 608, with a duration of 1.5, a position value of 12 and a look-back length of 8.

There are also a number of duration interval repeats. The series of notes 607 and 608 is repeated by the series of notes 613 and 614. As the notes 613 and 607 have the same interval values (+1), this is a duration interval repeat. This duration interval repeat has a duration of 3.5, a position value of 10 and a look-back length of 8. Additionally, the note 613 is a duration interval repeat of the note 607 (interval value +1, duration 2, position value 10, look-back length 8), and the note 614 is a duration interval repeat of the note 608 (interval value +1, duration 1.5, position value 12, look-back length 8).

At repeat filtering step s304, some of the duration repeats and the duration interval repeats are deleted, as set out in the steps of FIG. 4.

At step s305, the music data is divided into frames as previously described.

At step s306, the frames are tagged as previously described. For example, assuming that a look-back length of 8 is a predefined look-back length, the frames corresponding to the series of notes 612, 613 and 614 will be tagged with a duration repeat tag "true", a duration interval repeat tag "false", a look-back length of 8 and a transposition tag null value.

At step s307, vectors are generated for the tagged frames and used as training vectors to train a neural network.

Generating Music Data

FIG. 1 shows an iterative method of generating new music data. In particular, certain steps of FIG. 1 may be repeated to continuously add music data to existing music data, or to music data that was generated in the last iteration of the method. In the context of a neural network, the data for the existing or previously-generated music data may comprise internal state data of the structure neural network, which is determined in dependence on the existing or previously-generated music data. As such, the internal state data may be updated at each iteration of the method based on the new music data (e.g. the new note) selected at the end of that iteration, in preparation for the next iteration. The music data may comprise one or more outputs to be output at one or more respective time instants. For example, the music data may comprise a note or a series of notes, each note corresponding to an output to be output at a specific point in time defined by the series of notes.

The generation of music data may be based on pre-existing music data, or may include the generation of a first note of music data. In other words, the generation of music data may be the generation of one or more notes to add to an existing series of notes, or may be the generation of the first note of a new piece of music. Preferably, both may be used together, such that the generation of music data comprises the generation of both the first note of the piece of music and also one or more subsequent notes.

In the case that the first, starting note of the music data must be generated, this may be achieved in various ways. The starting note may be generated with a fixed, predefined pitch and duration. Alternatively, the first, starting note may be chosen from a melody probability array comprising an array of probabilities associated with a plurality of notes. The selection of notes may by limited to a certain range, for example two octaves.

Generating Melody Probability Array, S101

When generating new music data, at step s101 a melody probability array is generated. The melody probability array comprises new note pitch values, wherein each new note pitch value has at least one associated new note duration, each pitch value and note duration combination having an associated melody probability value. The probability value may be based on the music data. Specifically, the melody probability value may be based on a pitch value and/or a duration value of at least one preceding note of the music data, and may be based on the pitch value and/or duration value of all preceding notes. The preceding note may be the immediately preceding note, or any other preceding note.

Alternatively, the melody probability value may not be based on any preceding notes (or any preceding music data), and could be a fixed probability or a random probability for each new note. In this case, the melody probability array could be a predefined list of notes and probabilities for each pitch and duration combination. This may be used particularly in the case of choosing the starting note of music data.

The new note pitch value describes the pitch of a note. For example, the melody new note pitch value may be C4, E5, F #5 and so on, where the letter designates the pitch class and the number designates the octave, as would be understood. The new note duration takes the value of a duration of a note such as a semi-quaver, quaver, crotchet, dotted crotchet, and so on. The new note duration may be quantified relative to the duration of a crotchet, the crotchet having a duration of 1. The melody probability value is the probability of the new note having a certain pitch value and a certain duration.

The melody probability array may be generated by a melody generator, where the melody generator comprises a neural network, such as a recurrent neural network that has been trained to generate a melody probability array based on durations and pitches of notes identified in music data. Such a melody probability array may be generated by the neural network trained to provide a probability for the duration and pitch of a new note based on the duration and pitch of a preceding note. The preceding note could be the immediately preceding note, or any other preceding note.

For example, with an RNN, the probability distribution of the melody probability array could be conditioned by the entire sequence of past notes. What constitutes a musically convincing note sequence is knowledge that is gained by the melody generator in training, and is encapsulated in a set of model parameters of the melody generator determined from a set of melody training data in training (and will depend on the type of melody data the melody generator is exposed to). Note that the learning objective of the melody generator is different to that of the structure generator: the melody generator is being trained to learn how to generate sequences of notes in a musical way, without consideration to the overall structure of the music, whereas the structure generator is being trained to learn to generate musical structure—in essence, similarity between contiguous or non-contiguous sections (e.g. bars) of the piece of music.

To achieve this, the neural network of the melody generator may be trained using an input of training vectors that have tags for the pitch and duration of each frame and, based on those training vectors, the neural network could be arranged to output an array of probabilities for the pitch and duration of a next note given the pitch and duration of a preceding note. As an example, for a given preceding note A, the trained neural network could provide probabilities for the next note to be one of A, B, C, D or E, each of these notes having a certain probability based on the note progressions observed by the neural network in the training vectors. As another example, for a given series of preceding notes A, B, C, the trained neural network could provide probabilities for the next note to be A, B or C. Although the neural network is trained to provide probabilities based on preceding notes, the neural network may still provide a probability array for the starting note of music data by simply inputting a null value into the network and sampling from the resultant array. For example, the selection of a note described in relation to the array of Table 5 below could be used.

Alternatively, the melody probability array may be generated by a set of predefined rules that determines a probability based on the duration and/or pitch of a preceding note. For example, as set out in column 7 lines 28 to 65 of U.S. Pat. No. 9,361,869 B2, a probability array as shown in FIG. 7 may be used. Each p in FIG. 7 represents an individual probability. Each of these probabilities may either be different from the other probabilities in the array or be equal to some or all of the other probabilities in the array. Each row of probabilities p in FIG. 7 represents a set of probabilities to be used given a particular duration of a preceding data object (note). Each column of probabilities in FIG. 7 represents a set of probabilities that a particular duration will be selected for the data object (note) being generated. As an example, a probability of the melody probability array of FIG. 7 may be selected using a weighting associated with various outcomes, as described in relation to the array of Table 5 below. To determine the duration of the note being generated, a row of the probability array is selected based on the duration of the preceding note. For example, if the duration of the preceding note was 2, the fourth row is selected. The selected row of the probability array represents the various likelihoods of the different possible durations for the next note. A particular duration may be selected for the note being generated. The same process can also be used to select the pitch of the note, using a similar array to that of FIG. 7, specific to pitch.

Other rules and selection methods may be used instead of the above method associated with FIG. 7. For example, the probability array could contain probabilities based on the pitch and/or duration of more than one preceding note, or indeed all preceding notes. Selection of probabilities from the array may also be achieved in any other manner that ensures that higher probability pitches/durations are more likely to be selected than lower probability pitches/durations.

Accordingly, the melody probability array provides a melody probability value of every possible new note pitch and duration (including rest notes). For practicality, the possible new notes may be limited to notes within a certain octave range of the preceding note or notes.

In an embodiment, the music data comprises at least one note and, at step 101, a melody probability array is generated to output an array of probabilities for a note to be added to the music data. As an example of music data to which a note is to be added, the music data of FIG. 6 will be again discussed. Although FIG. 6 was previously discussed in relation to training a neural network, FIG. 6 is being discussed here purely as an example of music data to which a note is to be added. As previously described, bar 602 comprises an A4 minim 606 followed by a B4 minim 607. Bar 603 comprises a C5 dotted crotchet 608 followed by a G4 quaver 609 followed by an F4 crotchet 610 followed by a G4 crotchet 611. Bar 604 comprises an A4 minim 612 followed by a B4 minim 613. Incomplete bar 605 comprises a C5 dotted crotchet 614. Label 615 of FIG. 6 represents the location for a new note to be added to the music data.

Figure 6:
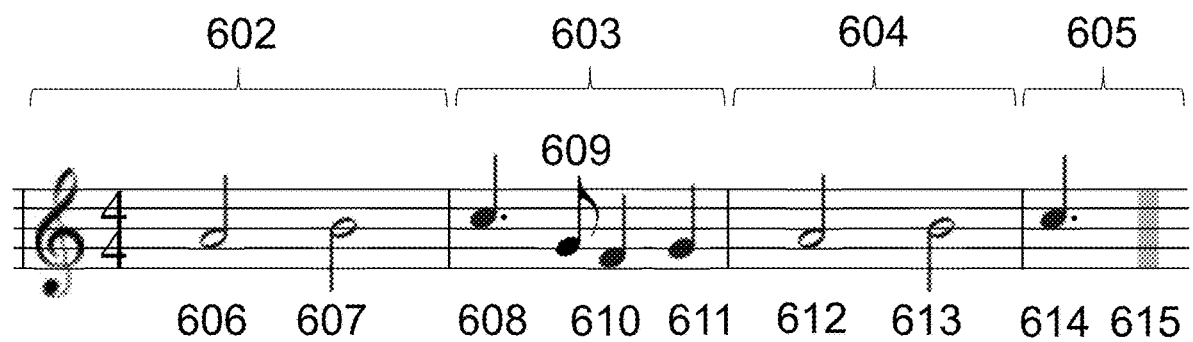
FIG. 6 shows a musical score.

Based on the piece of music of FIG. 6, the melody probability array outputs a plurality of probabilities for the new note. For example, the melody probability array may comprise a first melody probability value of 0.6 associated with a first note pitch value of G4 and a note duration of a quaver (i.e. 0.5 crotchets); a second melody probability value of 0.1 associated with a note pitch value of G4 and a note duration of a crotchet; and a third melody probability value of 0.3 associated with a note pitch value of F4 and a note duration of a quaver (i.e. 0.5 crotchets). Such a melody probability array is shown in Table 5 below.

TABLE 5

| Note | Duration | Probability |
|------|----------|-------------|
| G4   | 0.5      | 0.6         |
| G4   | 1        | 0.1         |
| F4   | 0.5      | 0.3         |

Selection of a note based on the example above melody probability array (generated by a neural network or based on predefined rules) may be achieved as set out, for example in U.S. Pat. No. 9,361,869 B2 in the name of Jukedeck Ltd. The above probability array represents three different outcomes: G4 quaver, G4 crotchet and F4 quaver. The list of probabilities is assigned numbers representing the listed probabilities. For the above listed probabilities, the numbers 0.6, 0.7 and 1.0 may be assigned to the outcomes G4 quaver, G4 crotchet and F4 quaver respectively. To select one of these outcomes, a random number between 0 and 1 is generated. The random number is compared with each assigned number in the probability array, and the outcome corresponding to the first assigned number that is greater than the random number is selected. For example, if the random number generated is 0.85, the outcome F4 quaver is selected as 1.0 is the first number greater than 0.85. The probability array is therefore a weighting associated with various outcomes. It can be seen that, in the above example, the outcome G4 quaver is the most likely as any random number between 0 and 0.6 would result in selection of the G4 quaver.

Selection of a note from the melody probability array could be achieved in a number of ways however, and is not limited to the above method. Any method of choosing an object from an array of objects having different probabilities could be used, with objects having a higher probability being chosen more often than objects having a lower probability, as would be understood. For example, Inverse Transform Sampling could be used, as is well-known in the art.

The above selection method could also be used to choose the starting note, the only difference being that the array of probabilities provided by the melody probability array is not based on existing music data. For example, the listed probabilities above could be random or fixed, or could be output by providing a null input to a neural network, as described.

Recording Structure History, s102

As step s102, a structure history of the music data describing preceding notes is recorded. The structure history is a series of vectors containing frame tags (wherein each vector may be further split into subvectors, as described above), such vectors and frame tags containing the same type of information such vectors and frame tags contained in the training process when using training data. However, where in the training process the vectors represent the structure of the training data, in the music generation process of FIG. 1 they represent the structure of the generated music data.

In an embodiment, the music data corresponds to the first, starting note of a piece of music, the starting note being generated and selected using any of the above-described methods. In this embodiment, step s102 takes place after the first, starting note of new music data has been generated. The number of vectors required to represent the new music data is added to the structure history. At step s102, the structure history is recorded by identifying the number of frames that represent the starting note, and adding each frame to the structure history as a corresponding vector. Each corresponding vector has the same format as the vectors described in relation to step s307 of FIG. 3. For example, if the music data corresponds to a starting note having a duration of 1.5 crotchets (i.e. a dotted crotchet), 6 frames are identified, in the case that a frame has a duration of a semiquaver. Now that the 6 frames have been identified, such frames are tagged as free music in their corresponding vectors as at this point there are no structure repeats to be identified. 6 vectors are therefore recorded as free music in the structure history.

One way of tagging a frame as free music may be assigning a null value to any structure tag in the vector, for example a duration repeat tag. Alternatively, a specific free music tag in the vector may be assigned a value of true. Indeed, many other ways may be used to tag a frame as corresponding to free music.

As will be described later, in the case that the music data corresponds to the first, starting note of a piece of music, the step s102 is only performed once based on that music data. Any subsequent update and recording of the structure history after step s102 is handled by step s107.

Alternatively, in another embodiment, in the case that the music data corresponds to multiple notes provided without using the steps of FIG. 1 to generate this music data, recording the structure history comprises performing the steps s301-s307 of FIG. 3 to arrive at a list of vectors to record the structure history. In other words, parameter values of the music data are identified and labelled, repeats are identified, the repeats are optionally filtered, the data is divided into frames and tagged, and vectors are generated for the frames. The vectors generated in this case are the vectors for the frames of the preceding notes, and such vectors represent the structure of the music data for the preceding notes. Again, any subsequent update and recording of the structure history after this step is handled by step s107.

Once recorded, the vectors for the structure history are used as an input to the structure neural network, for the current iteration, to generate a structure probability array, as will be described below. The vectors of the structure history may therefore be used directly to update a structure neural network being used in the music generation process. Alternatively, the vectors of the structure history may be stored in a database in computer memory.

Although step s102 is shown in FIG. 1 as following step s101, the order of these steps could be reversed or indeed they could be simultaneous.

Generating Structure Probability Array, s103

At step s103, a structure probability array based on music data is generated by the structure generator. Such an output may be termed a biasing output as it is used to bias the probabilities of the melody generator towards a repetition of structure. The biasing output in the current iteration may be generated based on one, two or all of the following: one or more notes of the initial sequence of notes (such as the most recent note or notes of the sequence, as selected in the previous iteration) or one or more vectors determined for that/those note(s) as received at the input in the current iteration, data of the internal state of the neural network, and data of the output of the structure generator in the previous iteration. As noted, the vector may represent musical structure implied by the note(s) to which it relates.

In this respect, it is noted that whilst "the initial sequence of notes" can mean a note or notes of the initial sequence of notes, it can also mean data that has been derived from a note or notes thereof, such as the internal state or the earlier output (or a combination of both/all three), i.e. data that is influenced by the note(s).

The structure probability array may be generated using a trained neural network based on using the structure history vectors of s102 as an input. The structure generator input may receive data of the note or notes of the piece of music so far (such as a vector or vectors determined for one or more of the notes), based on which the biasing output is generated in the current iteration of the method. Specifically, the structure generator may receive one or more vectors determined for the initial sequence of notes (i.e. the piece of music so far) as previously described, based on which the biasing output is generated in the current iteration.

There may be two inputs to the structure generator at each point in time:

(1) The musical structure in the form of one or more vectors (that is, one or more vectors in the encoding used in the dataset that the structure generator is familiar with, and uses in its own training phase—see above) implied by the most recent melody note generated by the melody generator. There may be an intermediate translation step external to both the structure generator and the melody generator that translates the note generated by the melody generator and the element of musical structure (e.g. duration repeat of lookback 8, duration-interval repeat of lookback 16, or other repeat type—see below) this note implies into a feature vector that can be interpreted by the structure generator.

(2) The structure generator's own internal state (which may contain knowledge of musical structure implied by one or more, or all, previously-generated melody notes).

Alternatively, the trained neural network may not actually take the notes or vectors as input. Instead, the neural network may rely only on its output in a previous iteration, and use that as its current input together with its internal state.

The structure generator provides the structure probability array as a biasing output in order to bias the probabilities generated by the melody generator to increase the likelihood that new music data is a repeat of previous music data.

The trained neural network is used to generate a structure probability array. The vectors of the structure history of step s102 are used as an input to the neural network. Depending on the number of notes described by the music data at this point, the structure history may, for example, include one or more vectors corresponding to a single note having a duration and pitch, or a plurality of vectors corresponding to a series of notes each having a duration and pitch.

First, the structure neural network is provided with one or more vectors that make up the structure history. Based on the vector(s) of the structure history, the neural network outputs an array of probabilities (the structure probability array) for each possible combination of tags for the next frame in the sequence, optionally only for predefined look-back durations. Using the example tags discussed so far, the array output by the neural network therefore contains probabilities for each combination of the following tags to be present in the next frame:

Duration repeat tag true
Duration repeat tag false
Optionally, duration interval tag true
Optionally, duration interval tag false
Look-back length tag, optionally only for each of the predefined look-back durations
Optionally, transposition tag true
Optionally, transposition tag false Entries in the array corresponding to look-backs that either look back to before the start of the music data or don't look back to the start of a note are deleted.

In the case that the music data corresponds to the starting note only, i.e. the first iteration of the method, the structure history is simply vectors tagged as free music. Based on these input vectors, the neural network outputs an array of probabilities (structure probability array) for each possible combination of tags for the next frame in the sequence, based on the fact that all preceding vectors/frames are tagged as free music. Alternatively, a zero vector could be used as input in this case if it does not conflict with any assumptions regarding the data, or a default initial input may be used.

Continuing with step s103, the vectors in the structure history are used as an input to the trained neural network, which outputs/generates a structure probability array (biasing array) for the next frame in the music. Again, using the example of FIG. 6 purely as an example of music data to which a note may be added, this is frame 615. For example, the trained neural network may output a structure probability array that comprises the assigned probabilities listed in Table 6 below:

TABLE 6

| Duration repeat | Duration interval repeat | Look-back length | Transposition | Probability |
| --- | --- | --- | --- | --- |
| True | False | 8 | Null | 0.4 |
| True | False | 7.5 | Null | 0.1 |
| True | False | 6.5 | Null | 0.1 |
| True | True | 8 | False | 0.3 |
| False | False | Null | Null | 0.1 |

The biasing output may alternatively or additionally (and possibly primarily) be generated in the current iteration based on an output of the structure generator in a previous iteration. That output may comprise a biasing output generated in the previous iteration.

Modifying Probabilities in Melody Probability Array, s104

At step s104, the probabilities in the melody probability array are modified or biased by combining one or more probabilities of the structure probability array with the probabilities in the melody probability array. The structure probability array is a list of tags and associated probabilities, as previously described, for example as shown in Table 6.

It is possible to determine the note or notes satisfying the tags in the structure probability array. In the example of FIG. 6 and in the context of generating tags for frame 615, with reference to the tag combinations of Table 6, in descending order starting from the combination at the top of the table, the first tag combination corresponds to the G4 quaver note 609 and is satisfied by a quaver of any pitch (because of the "false" duration interval repeat tag); the second tag combination corresponds to the F4 crotchet note 610 and is satisfied by any crotchet; the third tag combination corresponds to the G4 crotchet note 611 and is satisfied by any crotchet; the fourth tag combination corresponds to the G4 quaver note 609 and is satisfied by a G quaver (in any octave, to satisfy the requirement of having the same interval value) and the fifth tag combination corresponds to free music and is satisfied by any note that is not a duration repeat or duration interval repeat.

Now that we have determined the probabilities that the structure probability array assigns to the various possible durations or durations and pitches of the note of frame 615, these are used to influence the probabilities provided by the melody generator such that the probability of each duration and pitch combination provided by the melody generator is adjusted. As mentioned above, the melody generator provides a melody probability array comprising new note pitch values, wherein each new note pitch value has an associated new note duration and an associated melody probability value. The probabilities of the melody probability array are combined with (in other words, biased by) the one or more probabilities of the structure probability array to provide a modified melody probability array. These probabilities may be combined in a number of ways to achieve this result.

For example, for a given melody probability array, the number of notes of the melody probability array that satisfy a certain tag combination of the structure probability array is used to modify the probability of that tag combination.

As an example, let's say that the melody probability array provides probabilities for the following notes: a G4 quaver, an A5 quaver, an F4 crotchet and an E5 crotchet. Let's also say that the structure probability array provides a probability of 0.7 for the tag combination: duration repeat true, look-back length 2. Finally, let's say that the duration of the note that corresponds to a look-back length 2 is 1, i.e. the original note is a crotchet. In this example, the melody probability array has provided probabilities for two crotchets: F4 and E5. Accordingly, in this case the 0.7 probability provided by the structure probability array for the particular tag combination is divided by the number of crotchets, i.e. 2, to result in a shared structure probability of 0.35 that the next note has a duration of 1 (crotchet). In other words, the probability of the tag combination is divided by the number of notes (of the melody array) that satisfy that combination.

The melody probability value for each crotchet, regardless of pitch, is then multiplied by the shared structure probability to generate a modified melody probability value for those given notes. The same process is applied to every note in the melody probability array. As structure probabilities for every note duration in the melody array are determined, the same process is applied to every note in the melody probability array such that the probability of each note in the melody probability array is multiplied by a probability value. Therefore, even though all melody probabilities are decreased (by virtue of each shared structure probability being less than 1), the probability of notes having a lower shared structure probability is decreased to a greater extent than notes having a higher shared structure probability.

For example, the melody probability array may initially assign the same probability value to two different note durations, making both note durations equally likely to be the next note. However, if the structure array has assigned a higher shared structure probability value to one note duration than the other, after multiplication the two note durations will have different probabilities. The note duration with the higher probability is therefore more likely to be selected as the note duration of the next note.

Alternatively, the modified probability array may be generated as a sum of the multiple probability values. The sum may be a weighted sum, where each of the repeat type probabilities is weighted by the inverse of a cumulative probability of the notes resulting in a repeating musical structure of that type. As another alternative, a maximum of the multiple probabilities may be used.

The above is only some example methods of combining two probability arrays. Any other method could be used such that the probabilities in one array affect those in the other, and the specific method explained above is not essential. A more detailed example is provided below.

Selecting New Note Pitch and Duration from Modified Melody Probability Array, s105

At step s104, a new note having a new note pitch value and a new note duration value is selected from the modified melody probability array. The new note may be chosen from the modified melody probability array in any manner, for example as set-out in relation to the array of Table 5 discussed previously, using a weighting method combined with a random number. As an example, the modified melody probability array may be sampled to select a new note, or the new note may simply be chosen by selecting the vector or vectors with the highest probability. Alternatively, the new note may be chosen using any other method that ensures that notes with a higher probability are more likely to be chosen than notes with a lower probability.

As the modified probability array is biased by the probabilities of the structure array, the likelihood that the new note has an element that is a repeat of an element of a previous note may be increased if, based on the training data used to train the structure network, the circumstances provided at the time indicate that a repeat of that element is expected.

Adding Music Data, s106

At step s106, the new note is added to the music data, wherein the new note has the selected new note pitch value and new note duration value. Specifically, the new note is added in sequence to the existing sequence of notes in the music data, such that the new note appears next in the sequence. Step s106 may also include the outputting of the notes of the music data in respective positions in a sequence of notes. A first note may provide a first portion of the output, and subsequent notes may provide subsequent portions of the output. The music data defining the notes may represent audio data or MIDI data, and outputting the notes may comprise playing the audio data or MIDI data. Alternatively, outputting the audio data or MIDI data may be storing the audio data for playing, or storing the MIDI data.

Updating the Structure History, s107

After the new note is added to the music data, the structure history must be updated by assigning one or more vectors to the new note. In this way, the structure history is up-to-date and may be used as an input to the structure neural network to allow the process to be repeated, as discussed below. At step s107, the structure history is updated by adding new vectors to the structure history that represent the structure of the new music data.

To add new vectors to the structure history, the frame tags that those new vectors should contain must first be determined. This may be achieved by modifying the structure probability array of step s103 to create a modified structure probability array. In order to create the modified structure probability array, any combinations of tags in the structure probability array of step s103 that are incompatible with the selected new note pitch value and new note duration value are removed. In this way, the modified structure probability array does not contain any combinations of tags that represent repeats that the new note could not be considered to be a part of.

The neural network for generating the structure array may comprise at least one stateful component having an internal state, which is updated at each iteration of the method based on the internal state at the end of each iteration and the musical structure implied by the note or notes selected in the previous iteration. That is, a new internal state for the stateful component may be determined based on a current internal state of the stateful component (i.e. the state of the stateful component at the end of the iteration) and (indirectly) the note or notes that have just been selected/added.

In the example of FIG. 6 and in the context of having already generated new music data for frame 615, let us assume that the generated music data at frame 615 is a G4 quaver. In this instance, if the structure probability array of step s103 contained a combination of tags with a duration repeat tag "true", a duration interval repeat tag "true", a look-back length of 8 and a transposition tag "false", this combination of tags would be kept in the modified structure probability array, because this combination of tags represents a repeat of the G4 quaver 609, which is consistent with the generated G4 quaver. However, if the structure probability array of step s103 contained a combination of tags with a duration repeat tag "true", a duration interval repeat tag "false" and a look-back length of 1.5, this combination of tags would not be included in the modified structure probability array, because this combination of tags represents a repeat of the dotted crotchet 614, which is inconsistent with the generated G4 quaver.

At this point, the modified structure probability array contains a list of all tag combinations that are compatible with the newly generated music data, in this case a G4 quaver. However, in order for the structure history to be up-to-date, only one combination of tags should be assigned to the frames corresponding to the new music data.

Therefore, a single combination of tags of the modified structure probability array is then selected from the modified structure probability array. The single combination of tags may be selected in a number of ways. The selection may be based on the distribution of probabilities of combinations of tags in the modified structure probability array. For example, the single combination of tags may be selected using the previously described probability weighting and random number method discussed in relation to Table 5, which makes the combination of tags with the highest probability the most likely to be selected. Alternatively, the combination of tags having the highest probability may simply be selected. Alternatively, each combination of tags of the modified structure probability array may be chosen at random, irrespective of their probabilities.

Alternatively, a combination of tags may be selected without the use of a modified structure probability array. For example, a combination of tags may be selected according to hard-coded rules that select a tag combination compatible with the new note that was added to the music data.

Once a combination of tags has been selected from the modified structure probability array, a vector is created for each frame of the new music data, wherein each vector has the same format as the vector at s307, and the selected combination of tags is stored in each vector. These vectors are then added to the structure history.

A detailed example of steps s104-s107 will now be provided. Once trained on the above described structure dataset, the neural network of the structure generator (structure model $M_s$) is then used with the neural network of the melody generator (melody model $M_m$). At time t (that is, given the history of notes generated up to time t), the model $M_m$ predicts a probability distribution $P_t$ over a set of notes N. At the same time, given the history of repeats generated so far, the structure model $M_s$ predicts a probability distribution $Q_t$ over a set of possible repeats Π, which includes an element $\pi_f$, representing 'free music'. Each note v∈N can be consistent with a subset $\Pi_t^v$ of these repeats, which will always include $\pi_f$, meaning that every note is consistent with 'free music'. The structure model influences the prediction $P_t$ by modifying the probability of each note according to the probabilities of the repeats with which it is consistent. Let $\varphi_t : N \times \Pi \rightarrow \{0, 1\}$ be a function such that $\phi_t(v, \pi)=1$ when note v is consistent with repeat π at time t and 0 otherwise. In terms of this we can express $\Pi_t^v$ as $\{\pi \in \Pi | \phi_t(v, \pi)=1\}$, and further define $N_t^\pi = \{v \in N | \phi_t(v, \pi)=1\}$, which is the set of notes consistent with π. Each note v is then assigned a weight:

$$W_t(v) = P_t(v) \sum_{\pi \in \Pi_t^v} \frac{Q_t(\pi)}{\mu_t^\pi}, \quad (1)$$

where $\mu_t^\pi = \Sigma_{v \in N_t^\pi} P_t(v)$. In this way, the relative probability of a note v is increased when it is consistent with repeat(s) to which $M_s$ has assigned high probability. It is important to note that, in this example, $M_m$ and $M_s$ operate at different temporal resolutions—note-level and semiquaver frame-level respectively—and that this difference becomes significant here. Suppose note v is of duration $\Delta v = \tau_v \sigma$, where δ is the frame duration and $\tau_v$ is the number of frames occupied by v. Ideally, in order to get an accurate estimate of the joint probability of the note v and the repeat π, one should consider the probability that $M_s$ assigns to $\tau_v$ consecutive frames of π. This would be expressed as:

$$W_t(v) = P_t(v) \sum_{\pi \in \Pi_t^v} \prod_{k=0}^{\tau-1} \frac{Q_{t+k}(\pi)}{\mu_{t+k}^\pi}. \quad (2)$$

However, it has been found that the single-step approximation (1) works well in practice and is less computationally intensive than (2). Next, the weight distribution $W_t$ is normalised to obtain a probability distribution Rt:

$$R_t(v) = \frac{W_t(v)}{\Sigma_{v \in N} W_t(v)}. \quad (3)$$

We may now sample a note $v_t$ from this distribution and update the internal state of the melodic model $M_m$ with this observation. It remains to update the state of the structure model $M_s$ with some observed repeat. The note $v_t$ sampled at time t could be associated with any of the repeats that were consistent with it. One note may be chosen by sampling $\pi_t$ from a distribution $S_t$ over $\Pi_t^{v_t}$ defined as:

$$S_t(\pi) = \frac{Q_t(\pi)}{\Sigma_{\pi' \in \Pi_t^{v_t}} Q_t(\pi')}. \quad (4)$$

At this point the two models are misaligned due to the different time-scales they operate in, with $M_m$ being z semiquaver frames ahead of $M_s$. Since each update of the state of $M_s$ takes it ahead by just one semi-quaver frame, it is necessary to update $M_s$ τ times repeatedly with the same structure vector so that it is once again aligned with $M_m$. At the end of the process described above, we have a melody note sampled from the melody model that has been influenced or biased by the neural network of the structure generator. This neural network has also updated its own state according to the sampled note and is ready to influence/bias the choice of next note.

The above detailed example should be treated as such, and there are other ways in which these steps may be achieved that do not require the specific steps and formulae outlined above. In particular, the formulae shown in section 4.2 of the enclosed Annex may also be used, this Annex being incorporated by reference in its entirety.

Generating Further New Music Data—Subsequent Iterations

A selection of the steps of FIG. 1 may be repeated to generate further new music data, i.e. continue the piece of music, in subsequent iterations of the method. Each successive new note may be added to the existing music data after each iteration to form new music data that may again follow the process of FIG. 1. However, the step s102 need not be repeated as, in the second and any successive run-through, the structure history is already up-to-date by virtue of step s107. Therefore, after the first run-through of the steps of FIG. 1, the following steps are required for each successive loop of the process: s101, s103, s104, s105, s106 and s107. At step s103, the input to the neural network (if used) is the updated structure history provided at step s107 of the preceding run-through, and the structure probability array is generated based thereon. In this way, successive notes can be added to the music data by looping through some of the steps of FIG. 1.

The looping/iterating of the steps of FIG. 1 may terminate once a predefined length of music has been generated, or may terminate randomly after generation of a note based on a termination probability. For example, the looping of FIG. 1 may terminate after a certain number of notes have been generated, or after a certain duration of music has been generated.

Throughout this description, frames and notes have been discussed in relation to certain steps. However, although some steps may specifically relate to frames or notes, these are interchangeable. For example, step s305 discusses dividing the data into frames, however the data may remain in terms of notes and then notes would be tagged at step s306. The generated vectors at steps s307 would then be vectors representing notes instead of frames, with each note having a single corresponding vector. As another example, the structure history at step s102 may be recorded in terms of notes, and updated in terms of notes at step s107, and the structure probability array may provide tag combination probabilities for the next note, not the next frame. As another example, the melody probability array at step s101 may comprise probabilities for new note pitch values and durations for the next frame, or for a plurality of next frames, rather than the next note. It can be seen that the use of frames and notes is interchangeable and it is not essential to use one or the other in the methods described herein.

The various methods described above may be implemented by a computer program product. Software resident on a device is an example of such a computer program product. The computer program product may include computer code arranged to instruct a computer or the device to perform the functions of one or more of the various methods described above. The computer program and/or the code for performing such methods may be provided to an apparatus, such as a computer or the device, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid-state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or a device may be configured in accordance with such code to perform one or more processes in accordance with the various methods discussed herein. In one arrangement the apparatus comprises a processor, memory, and a display. Typically, these are connected to a central bus structure, the display being connected via a display adapter. The system can also comprise one or more input devices (such as a mouse and/or keyboard) and/or a communications adapter for connecting the apparatus to other apparatus or networks. In one arrangement a database resides in the memory of the computer system. Such an apparatus may take the form of a data processing system. Such a data processing system may be a distributed system. For example, such a data processing system may be distributed across a network.

The invention claimed is:

1. A computer-implemented method of generating a piece of music, the method comprising:
   determining an initial sequence of notes for the piece of music;
   determining at least one probability distribution for selecting at least one subsequent note from a set of candidate notes, wherein the at least one probability distribution is generated by a melody generator, and wherein the melody generator is trained to learn generation of sequences of notes in a musical way without consideration to an overall structure of the piece of music;
   generating a structure probability array by a structure generator based on data of the initial sequence of notes, wherein the structure generator is trained to learn generation of a musical structure indicating similarity between sections of the piece of music; and
   extending the initial sequence of notes with the at least one subsequent note selected from the set of candidate notes based on the at least one probability distribution and the structure probability array, wherein the structure probability array biases a selection of the at least one subsequent note to affect a likelihood of the selection resulting in a repeat of a musical element formed by the initial sequence of notes.

2. The method of claim 1, wherein the biasing output is generated by a structure generator.

3. The method of claim 2, wherein the structure generator is a machine learning (ML)-based structure generator.

4. The method of claim 1, wherein the melody generator is a machine learning (ML)-based melody generator, and wherein the melody generator is trained to generate a melody probability array comprising a plurality of probability values corresponding to the set of candidate notes.

5. A computer-implemented method of providing one or more outputs at one or more respective time instants, the method comprising:
   generating at least one first data object executable to provide a first portion of an output, the at least one first data object comprising a parameter having a first value associated therewith;
   placing the at least one first data object in a first position in a sequence;
   generating at least one second data object executable to provide a second portion of the output, the at least one second data object comprising the parameter;
   generating a first array of probabilities by a first neural network for a second value of the parameter for the at least one second data object, the first array of probabilities being influenced by the first value, wherein the first neural network is trained to learn generation of sequences of notes in a musical way without consideration to an overall structure of a piece of music;
   generating a second array of probabilities by a second neural network for the second value of the parameter, the second array of probabilities comprising a probability that the second value is equal to the first value, wherein the second neural network is trained to learn generation of a musical structure indicating similarity between sections of the piece of music;
   combining the first array and the second array to provide a modified array of probabilities;
   determining and setting the second value based on the modified array of probabilities;
   placing the at least one second data object in a second position in the sequence, the second position providing a second portion of the output; and
   outputting the at least one first and second data objects at the respective first and second positions in the sequence to provide the output, wherein the at least one first and second data objects represent audio data or MIDI data.

6. The method of claim 5, wherein outputting the first and second data objects comprises:
   playing the audio data or MIDI data, or
   storing the audio data for playing, or
   storing the MIDI data.

7. The method of claim 5, wherein the first data object corresponds to a first musical note, and the second data object corresponds to a second musical note.

8. The method of claim 7, wherein the parameter is a note duration and the first and second values are note duration lengths.

9. The method of claim 7, wherein the parameter is one of: a note pitch, a note dynamic, or a note articulation.

10. The method of claim 5, wherein the first data object further comprises a first pitch value, wherein the first pitch value is a first note pitch, the first array of probabilities is influenced by both the first value and the first pitch value.

11. The method of claim 10, wherein the second data object further comprises a second pitch value, wherein the second pitch value is a second note pitch.

12. The method of claim 5, wherein the first array of probabilities is generated based on a rule.

13. The method of claim 5, wherein the first data object corresponds to a first note in a piece of music.

14. The method of claim 13, wherein the second data object corresponds to a second note in a piece of music.

15. The method of claim 5, wherein the second position in the sequence directly follows the first position in the sequence.

16. The method of claim 5, wherein the second position in the sequence does not directly follow the first position in the sequence.

17. A non-transitory computer-readable storage medium, storing executable instructions which are configured, when executed on one or more processors, cause the one or more processors to perform operations comprising:

determining an initial sequence of notes for a piece of music;

determining at least one probability distribution for selecting at least one subsequent note from a set of candidate notes, wherein the at least one probability distribution is generated by a melody generator, and wherein the melody generator is trained to learn generation of sequences of notes in a musical way without consideration to an overall structure of the piece of music;

generating a structure probability array by a structure generator based on data of the initial sequence of notes, wherein the structure generator is trained to learn generation of a musical structure indicating similarity between sections of the piece of music; and extending the initial sequence of notes with the at least one subsequent note selected from the set of candidate notes based on the at least one probability distribution and the structure probability array, wherein the structure probability array biases a selection of the at least one subsequent note to affect a likelihood of the selection resulting in a repeat of a musical element formed by the initial sequence of notes.

\* \* \* \* \*